US012756604B2

(12) United States Patent
Patchava et al.

(10) Patent No.: US 12,756,604 B2
(45) Date of Patent: Oct. 6, 2026

(54) CP-TRANSPARENT OOK OFDM WAVEFORM FOR AN AMBIENT IoT

(71) Applicant: QUALCOMM Incorporated, San Diego, CA (US)

(72) Inventors: Raviteja Patchava, San Diego, CA (US); Piyush Gupta, Bridgewater, NJ (US); Ahmed Abdelaziz Ibrahim Abdelaziz Zewail, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 275 days.

(21) Appl. No.: 18/618,996

(22) Filed: Mar. 27, 2024

(65) Prior Publication Data

US 2025/0310160 A1 Oct. 2, 2025

(51) Int. Cl.

| | |
|---|---|
| ***H04L 27/02*** | (2006.01) |
| ***H04J 13/00*** | (2011.01) |
| ***H04L 5/00*** | (2006.01) |
| ***H04L 27/26*** | (2006.01) |

(52) U.S. Cl.

CPC .......... *H04L 27/02* (2013.01); *H04J 13/0062* (2013.01); *H04L 5/0007* (2013.01); *H04L 27/26025* (2021.01)

(58) Field of Classification Search

CPC ......... H04W 52/0229; H04W 52/0235; H04W 52/0216; H04W 84/12; H04W 72/0446; H04W 88/06; H04W 56/001; H04W 24/08; H04L 5/0007; H04L 27/02; H04L 5/0053; H04L 27/0008; H04B 1/707

See application file for complete search history.

(56) References Cited

U.S. PATENT DOCUMENTS

| | | | | |
|---|---|---|---|---|
| 2019/0273518 A1* | 9/2019 | Wang | .................. | H04B 1/0028 |
| 2019/0327119 A1* | 10/2019 | Muehlmann | ...... | H04L 25/03159 |
| 2023/0422172 A1* | 12/2023 | Li | ..................... | H04W 52/0229 |
| 2025/0126004 A1* | 4/2025 | Cheng | ............... | H04W 52/0235 |

FOREIGN PATENT DOCUMENTS

| | | | |
|---|---|---|---|
| JP | 7194489 B2 * | 12/2022 | .............. H03M 5/12 |

* cited by examiner

*Primary Examiner* — Khalid W Shaheed

(74) *Attorney, Agent, or Firm* — LOZA & LOZA, LLP

(57) ABSTRACT

Aspects relate to enhancing communication between network entities and ambient IoT devices using a cyclic prefix (CP) transparent on-off keying (OOK) waveform. An ambient IoT device may be configured to receive an OOK orthogonal frequency-division multiplexing (OFDM) waveform that includes a CP. The ambient IoT device may be configured to sample symbols of the received OOK OFDM waveform at a pre-defined sampling rate. The pre-defined sampling rate may be based upon a pre-defined duration of the symbols of the received OOK OFDM waveform. In particular, the pre-defined duration of each of the symbols of the received OOK OFDM waveform may be defined such that a last OOK OFDM symbol duration is set to be the same as a first OOK OFDM symbol duration, in which, the first OOK OFDM symbol includes the CP.

18 Claims, 14 Drawing Sheets

CP-TRANSPARENT OOK OFDM WAVEFORM FOR AN AMBIENT IoT

TECHNICAL FIELD

The technology discussed below relates generally to wireless communication networks, and more particularly, to mechanisms for ambient Internet of Things (IoT) communication.

INTRODUCTION

The 3rd Generation Partnership Project (3GPP) has specified several cellular technologies for applications related to the Internet of Things (IoT) in licensed spectrum, including Long Term Evolution (LTE) for machine-type communications (LTE-M), narrowband IoT (NB-IoT) supporting massive machine type communication (mMTC), reduced capability (RedCap) for MTC, extended-coverage GSM for IoT (EC-GSM-IoT), and ultra-reliable low-latency communications (URLLC). Applications include, for example, sensors, surveillance cameras, wearable devices, smart meters and smart meter sensors. To meet the power requirements in 5G New Radio (NR) and IoT wireless communications, IoT devices may be configured to perform radio frequency (RF) energy harvesting to accumulate energy over time.

IoT devices may include, for example, active IoT devices, passive IoT devices, and semi-passive IoT devices, each being capable of harvesting the ambient energy from RF signals or other ambient energy sources. For example, in active IoT devices, the accumulated energy can charge a power source (e.g., a battery) of the IoT device to perform various tasks, such as data reception, data decoding, data encoding, and data transmission. Passive IoT devices, such as radio frequency identification (RFID) devices, may include, for example, small transponders, or tags, capable of harvesting energy over the air to power the transmission/reception circuitry. Passive RFID sensors may be used, for example, in asset management, logistics, retail environments, warehousing, and manufacturing.

Envelope tracking has been proposed to detect a transmitted forward link signal at an ambient IoT device. However, this may only work with very low-tier ambient IoT devices that do not have active radio frequency (RF) components, and, in which, carrier frequency offset (CFO) and frequency synchronization is not needed.

Further, on-off keying (OOK) waveforms have been proposed for use with ambient IoT devices. OOK waveforms may be generated using orthogonal frequency-division multiplexing (OFDM) waveforms and may be easy to multiplex with data signals.

However, OOK waveforms generated using OFDM require the use of cyclic prefixes (CPs) to support multiplexing with data transmissions. OOK transmissions that use CP-OFDM may cause various difficulties for an ambient IoT device. For example, a low power ambient IoT device may have a limited sampling rate, such that it is difficult for the tag to skip the CP samples at the receiver, and it causes inter-symbol interference (ISI) to ambient IoT data.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an ambient Internet of Things (IoT) device is provided. The ambient IoT device includes one or more memories and one or more processors coupled to the one or more memories. The one or more processors may be configured to receive an on-off keying (OOK) orthogonal frequency-division multiplexing (OFDM) waveform including a cyclic prefix (CP). Further, the one or more processors may be configured to sample symbols of the received OOK OFDM waveform at a pre-defined sampling rate. The pre-defined sampling rate is based upon a pre-defined duration of the symbols of the received OOK OFDM waveform, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP.

Another example provides a method operable at an ambient Internet of Things (IoT) device. The method includes receiving an on-off keying (OOK) orthogonal frequency-division multiplexing (OFDM) waveform including a cyclic prefix (CP). The method further includes sampling symbols of the received OOK OFDM waveform at a pre-defined sampling rate. The pre-defined sampling rate is based upon a pre-defined duration of the symbols of the received OOK OFDM waveform, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP.

Another example provides an ambient Internet of Things (IoT) device. The ambient IoT device includes means for receiving an on-off keying (OOK) orthogonal frequency-division multiplexing (OFDM) waveform including a cyclic prefix (CP) and means for sampling symbols of the received OOK OFDM waveform at a pre-defined sampling rate. The pre-defined sampling rate is based upon a pre-defined duration of the symbols of the received OOK OFDM waveform, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
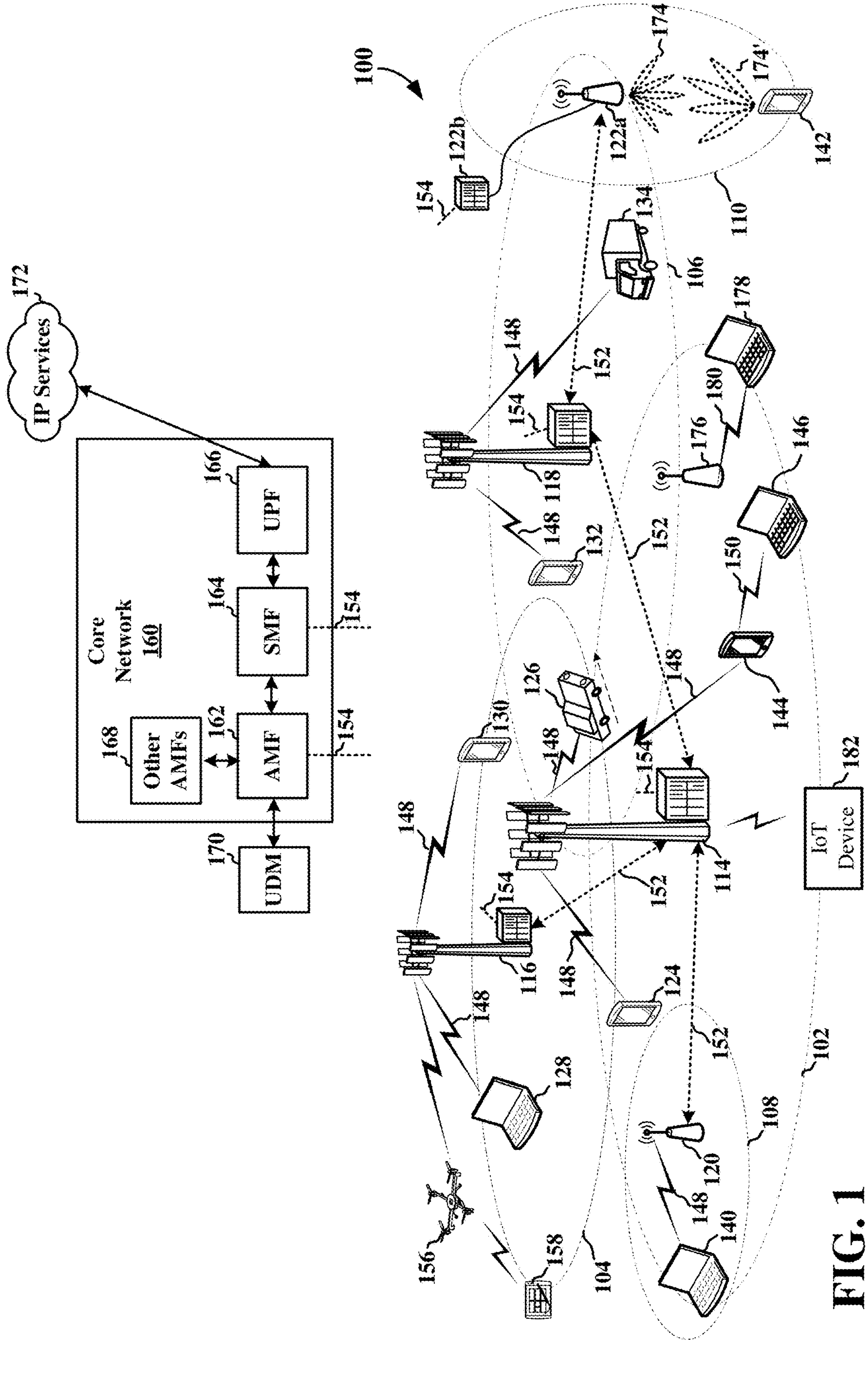
FIG. 1 is a diagram illustrating an example of a wireless communication system and an access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station or UE), end-user devices, etc. of varying sizes, shapes and constitution.

IoT devices are devices with sensors, processing ability, software and other technologies that connect and exchange data with other devices and systems over the Internet and/or other communications networks. The Internet of Things (IoT) is an ever-growing technology that allows devices to create a global communication network by exchanging data through the Internet and acting on that data.

Ambient Internet of Things (IoT) devices, such as active IoT devices, passive IoT devices (e.g., RFID tags), or semi-passive IoT devices, may harvest energy from one or more ambient energy sources, including solar/heat energy sources, vibration energy sources, or radio frequency (RF) energy sources. RF energy sources may include, for example, network entities, which may include RFID readers, base stations (e.g., gNBs or other base station configurations/designs), or other network access devices, and/or other suitable RF energy sources (e.g., television). For example, in active IoT devices, the accumulated energy can charge a power source (e.g., a battery) of the IoT device to perform various tasks, such as data reception, data decoding, data encoding, and data transmission. Passive IoT devices, such as radio frequency identification (RFID) devices, may include, for example, small transponders, or tags, capable of harvesting energy over the air to power the transmission/reception circuitry. Ambient IoT devices may be used, for example, in asset management, logistics, retail environments, warehousing, and manufacturing.

On-off keying (OOK) waveforms have been proposed for use with ambient IoT devices. OOK waveforms may be generated using orthogonal frequency-division multiplexing (OFDM) waveforms and may be easy to multiplex with data signals, which would be desirable for low-power ambient IoT devices that have low sampling rates.

However, OOK OFDMs require the use of cyclic prefixes (CPs) to support multiplexing with data transmissions, which are difficult to use with ambient IoT devices. For example, a low power ambient IoT device (e.g., a tag) may have a limited sampling rate, such that it is difficult for the tag to skip the CP samples at the receiver, and as such, the CP samples may cause inter-symbol interference (ISI) with ambient IoT data.

Various aspects relate to enhancing communication between network entities and ambient IoT devices and using a cyclic prefix (CP) transparent OOK OFDM waveform. An ambient IoT device may be configured to receive an OOK OFDM waveform that includes a CP. The ambient IoT device may be configured to sample symbols of the received OOK OFDM waveform at a pre-defined sampling rate. The pre-defined sampling rate may be based upon a pre-defined duration of the symbols of the received OOK OFDM waveform. In particular, the pre-defined duration of each of the symbols of the received OOK OFDM waveform may be defined such that a last OOK OFDM symbol duration is set to be the same as a first OOK OFDM symbol duration, in which, the first OOK OFDM symbol includes the CP.

Based upon this configuration of OFDM symbol durations in the OOK OFDM waveform by the network entity that includes the CP, a CP-transparent OOK OFDM waveform is created for the ambient IoT device. In this way, an ambient IoT device can set a sampling rate to match the OOK OFDM symbol boundaries (including the CP), such that inter-symbol interference (ISI) issues do not occur. In particular, the ambient IoT device can set a sampling rate to be equal to the pre-defined duration of each symbol of the received CP-transparent OOK OFDM waveform, such that inter-symbol interference (ISI) issues do not occur. By utilizing this methodology, OFDM symbols for data multiplexing can be used by ambient IoT devices without ISI issues related to CPs.

In some examples, after the ambient IoT device has synced with the network entity, the network entity may transmit control bits to the ambient IoT device. Using the control bits, the ambient IoT device knows whether the data is transmitted using a CP-transparent OOK OFDM waveform or a regular OFDM waveform, and the ambient IoT device can choose to decode data at the pre-defined sampling rate, as previously described, based on the CP-transparent OOK OFDM waveform format, without ISI issues related to CPs.

The various concepts presented throughout this disclosure may be implemented across a broad variety of telecommunication systems, network architectures, and communication standards. Referring now to FIG. 1, as an illustrative example without limitation, a schematic illustration of a wireless communication network including a radio access network (RAN) 100 and a core network 160 is provided. The RAN 100 may implement any suitable wireless communication technology or technologies to provide radio access. As one example, the RAN 100 may operate according to 3$^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In other examples, the RAN 100 may operate according to a hybrid of 5G NR and 6G, may operate according to 6G, or may operate according to other future radio access technology (RAT). Of course, many other examples may be utilized within the scope of the present disclosure.

The geographic region covered by the RAN 100 may be divided into a number of cellular regions (cells) that can be uniquely identified by a user equipment (UE) based on an identification broadcasted over a geographical area from one access point or network entity. FIG. 1 illustrates cells 102, 104, 106, 108, and 110 each of which may include one or more sectors (not shown). A sector is a sub-area of a cell. All sectors within one cell are served by the same network entity. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective network entity serves each cell. Broadly, a network entity is responsible for radio transmission and reception in one or more cells to or from a UE. A network entity may also be referred to by those skilled in the art as a base station (e.g., an aggregated base station or disaggregated base station), base transceiver station (BTS), a radio base station, a radio transceiver, a transceiver function, a basic service set (BSS), an extended service set (ESS), an access point (AP), a Node B (NB), an evolved NB (eNB), a 5G NB (gNB), a transmission receive point (TRP), or some other suitable terminology. In some examples, a network entity may include two or more TRPs that may be collocated or non-collocated. Each TRP may communicate on the same or different carrier frequency within the same or different frequency band. In examples where the RAN 100 operates according to both the LTE and 5G NR standards, one of the network entities may be an LTE network entity, while another network entity may be a 5G NR network entity.

In some examples, the RAN 100 may employ an open RAN (O-RAN) to provide a standardization of radio interfaces to procure interoperability between component radio equipment. For example, in an O-RAN, the RAN may be disaggregated into a centralized unit (CU), a distributed unit (DU), and a radio unit (RU). The RU is configured to transmit and/or receive (RF) signals to and/or from one or more UEs. The RU may be located at, near, or integrated with, an antenna. The DU and the CU provide computational functions and may facilitate the transmission of digitized radio signals within the RAN 100. In some examples, the DU may be physically located at or near the RU. In some examples, the CU may be located near the core network 160.

The DU provides downlink and uplink baseband processing, a supply system synchronization clock, signal processing, and an interface with the CU. The RU provides downlink baseband signal conversion to an RF signal, and uplink RF signal conversion to a baseband signal. The O-RAN may include an open fronthaul (FH) interface between the DU and the RU. Aspects of the disclosure may be applicable to an aggregated RAN and/or to a disaggregated RAN (e.g., an O-RAN).

Various network entity arrangements can be utilized. For example, in FIG. 1, network entities 114, 116, and 118 are shown in cells 102, 104, and 106; and another network entity 122 is shown controlling a remote radio head (RRH) 122 in cell 110. That is, a network entity can have an integrated antenna or can be connected to an antenna or RRH by feeder cables. In the illustrated example, the cells 102, 104, 106, and 110 may be referred to as macrocells, as the network entities 114, 116, 118, and 122 support cells having a large size. Further, a network entity 120 is shown in the cell 108 which may overlap with one or more macrocells. In this example, the cell 108 may be referred to as a small cell (e.g., a microcell, picocell, femtocell, home base station, home Node B, home eNode B, etc.), as the network entity 120 supports a cell having a relatively small size. Cell sizing can be done according to system design as well as component constraints.

It is to be understood that the RAN 100 may include any number of network entities and cells. Further, a relay node may be deployed to extend the size or coverage area of a given cell. In some examples, a cell may not necessarily be stationary, and the geographic area of the cell may move according to the location of a mobile network entity.

FIG. 1 further includes an unmanned aerial vehicle (UAV) 156, which may be a drone or quadcopter. The UAV 156 may be configured to function as a network entity, or more specifically as a mobile network entity. That is, in some examples, a cell may not necessarily be stationary, and the geographic area of the cell may move according to the location of a mobile network entity such as the UAV 156.

In addition to other functions, the network entities 114, 116, 118, 120, and 122*a*/122*b* may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The network entities 114, 116, 118, 120, and 122*a*/122*b* may communicate directly or indirectly (e.g., through the core network 170) with each other over backhaul links 152 (e.g., X2 interface). The backhaul links 152 may be wired or wireless.

The RAN 100 is illustrated supporting wireless communication for multiple mobile apparatuses. A mobile apparatus is commonly referred to as user equipment (UE) in standards and specifications promulgated by the $3^{rd}$ Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a “mobile” apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an “Internet of things” (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 124, 126, and 144 may be in communication with network entity 114; UEs 128 and 130 may be in communication with network entity 116; UEs 132 and 138 may be in communication with network entity 118; UE 140 may be in communication with network entity 120; UE 142 may be in communication with network entity 122*a* via RRH 122*b*; and UE 158 may be in communication with mobile network entity 156. Here, each network entity 114, 116, 118, 120, 122*a*/122*b*, and 156 may be configured to provide an access point to the core network 170 (not shown) for all the UEs in the respective cells. In another example, a mobile network node (e.g., UAV 156) may be configured to function as a UE. For example, the UAV 156 may operate within cell 104 by communicating with network entity 116. UEs may be located anywhere within a serving cell. UEs that are located closer to a center of a cell (e.g., UE 132) may be referred to as cell center UEs, whereas UEs that are located closer to an edge of a cell (e.g., UE 134) may be referred to as cell edge UEs. Cell center UEs may have a higher signal quality (e.g., a higher reference signal received power (RSRP) or signal-to interference-plus-noise ratio (SINR)) than cell edge UEs.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In some examples, during a call facilitated by a network entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE May undertake a handoff or handover from the serving cell to the neighboring (target) cell. For example, UE 126 may move from the geographic area corresponding to its serving cell 102 to the geographic area corresponding to a neighbor cell 106. When the signal strength or quality from the neighbor cell 106 exceeds that of its serving cell 102 for a given amount of time, the UE 126 may transmit a reporting message to its serving network entity 114 indicating this condition. In response, the UE 126 may receive a handover command, and the UE may undergo a handover to the cell 106.

Wireless communication between a RAN 100 and a UE (e.g., UE 124, 126, or 144) may be described as utilizing communication links 148 over an air interface. Transmissions over the communication links 148 between the network entities and the UEs may include uplink (UL) (also referred to as reverse link) transmissions from a UE to a network entity and/or downlink (DL) (also referred to as forward link) transmissions from a network entity to a UE. For example, DL transmissions may include unicast or broadcast transmissions of control information and/or data (e.g., user data traffic or other type of traffic) from a network entity (e.g., network entity 114) to one or more UEs (e.g., UEs 124, 126, and 144), while UL transmissions may include transmissions of control information and/or traffic information originating at a UE (e.g., UE 124). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

The communication links 148 may use multiple-input and multiple-output (MIMO) antenna technology, including spatial multiplexing, beamforming, and/or transmit diversity. For example, as shown in FIG. 1, network entity 122*a*/122*b* may transmit a beamformed signal to the UE 142 via one or more beams 174 in one or more transmit directions. The UE 142 may further receive the beamformed signal from the network entity 122*a*/122*b* via one or more beams 174' in one or more receive directions. The UE 142 may also transmit a beamformed signal to the network entity 122*a*/122*b* via the one or more beams 174' in one or more transmit directions. The network entity 122*a*/122*b* may further receive the beamformed signal from the UE 142 via the one or more beams 174 in one or more receive directions. The network entity 122*a*/122*b* and the UE 142 may perform beam training to determine the best transmit and receive beams 174/174' for communication between the network entity 122*a*/122*b* and the UE 142. The transmit and receive beams for the network entity 122*a*/122*b* may or may not be the same. The transmit and receive directions for the UE 142 may or may not be the same.

The communication links 148 may utilize one or more carriers. The network entities and UEs may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The communication links 148 in the RAN 100 may further utilize one or more multiplexing and multiple access algorithms to enable simultaneous communication of the various devices. For example, 5G NR specifications provide multiple access for UL or reverse link transmissions from UEs 124, 126, and 144 to network entity 114, and for multiplexing DL or forward link transmissions from the network entity 114 to UEs 124, 126, and 144 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the network entity 114 to UEs 124, 126, and 144 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the communication links 148 in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex (FD).

In various implementations, the communication links 148 in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a “sub-6 GHz” band in various documents and articles. A similar nomenclature issue sometimes occurs with regard to FR2, which is often referred to (interchangeably) as a “millimeter wave” band in documents and articles, despite being different from the extremely high frequency (EHF) band (30 GHz-300 GHz) which is identified by the International Telecommunications Union (ITU) as a “millimeter wave” band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term “sub-6 GHz” or the like if used herein may broadly represent frequencies that may be less than 6 GHz, may be within FR1, or may include mid-band frequencies. Further, unless specifically stated otherwise, it should be understood that the term “millimeter wave” or the like if used herein may broadly represent frequencies that may include mid-band frequencies, may be within FR2, FR4, FR2-2, and/or FR5, or may be within the EHF band.

In some examples, access to the air interface may be scheduled, wherein a scheduling entity (e.g., a network entity 114) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs (e.g., UE 124), which may be scheduled entities, may utilize resources allocated by the scheduling entity 114.

Network entities are not the only entities that may function as scheduling entities. That is, in some examples, a UE may function as a scheduling entity, scheduling resources for one or more scheduled entities (e.g., one or more other UEs). For example, two or more UEs (e.g., UEs 144 and 146) may communicate with each other using peer to peer (P2P) or sidelink signals via a sidelink 150 therebetween without relaying that communication through a network entity (e.g., network entity 114). In some examples, the UEs 144 and 146 may each function as a scheduling entity or transmitting sidelink device and/or a scheduled entity or a receiving sidelink device to communicate sidelink signals therebetween without relying on scheduling or control information from a network entity (e.g., network entity 114). In other examples, the network entity 114 may allocate resources to the UEs 144 and 146 for sidelink communication. For example, the UEs 144 and 146 may communicate using sidelink signaling in a P2P network, a device-to-device (D2D) network, vehicle-to-vehicle (V2V) network, a vehicle-to-everything (V2X), a mesh network, or other suitable network.

In some examples, a D2D relay framework may be included within a cellular network to facilitate relaying of communication to/from the network entity 114 via D2D links (e.g., sidelink 150). For example, one or more UEs (e.g., UE 144) within the coverage area of the network entity 114 may operate as a relaying UE to extend the coverage of the network entity 114, improve the transmission reliability to one or more UEs (e.g., UE 146), and/or to allow the network entity to recover from a failed UE link due to, for example, blockage or fading.

The wireless communications system may further include a Wi-Fi access point (AP) 176 in communication with Wi-Fi stations (STAs) 178 via communication links 180 in a 5 GHz unlicensed frequency spectrum. When communicating in an unlicensed frequency spectrum, the STAs 170/AP 176 may perform a clear channel assessment (CCA) prior to communicating in order to determine whether the channel is available.

In some examples, a UE may correspond to an IoT device 182. The IoT device 182 may include, for example, a passive IoT device, such as RFID-type sensor/actuator (SA), a semi-passive IoT device, or an active IoT device. Active IoT devices and semi-active IoT device may include a battery or power source that may be charged, for example, using wireless power transfer (WPT) or, more generally, ambient energy harvesting, whereas passive IoT devices lack an internal power source, and therefore, use ambient energy harvesting to power the device. Semi-passive IoT devices may include a capacitor or other storage device that provides a warm start-up to the energy harvesting in the device. The IoT device 182 may communicate with a network entity (e.g., network entity 114 or RFID reader). In some examples, the network entity 114 may communicate with the IoT device via cellular (Uu) links. For example, the network entity 114 may provide an energy transmission on the downlink to power the IoT device. The energy transmission may further be modulated and backscattered by the IoT device 182 as an information-bearing signal on the uplink. In addition, the network entity 114 may transmit control information and/or data to the IoT device 182 on the downlink, which may be detected by the IoT device using, for example, envelope detection. In this manner, the network entity 114 may read information from the IoT device 182 and write information to the IoT device 182.

The network entities 114, 116, 118, 120, and **122*a*/122*b* provide wireless access points to the core network 160 for any number of UEs or other mobile apparatuses via core network backhaul links 154. The core network backhaul links 154 may provide a connection between the network entities 114, 116, 118, 120, and 122*a*/122*b* and the core network 170. In some examples, the core network backhaul links 154 may include backhaul links 152 that provide interconnection between the respective network entities. The core network may be part of the wireless communication system and may be independent of the radio access technology used in the RAN 100**. Various types of backhaul interfaces may be employed, such as a direct physical connection (wired or wireless), a virtual network, or the like using any suitable transport network.

The core network 160 may include an Access and Mobility Management Function (AMF) 162, other AMFs 168, a Session Management Function (SMF) 164, and a User Plane Function (UPF) 166. The AMF 162 may be in communication with a Unified Data Management (UDM) 170. The AMF 162 is the control node that processes the signaling between the UEs and the core network 160. Generally, the AMF 162 provides QoS flow and session management. All user Internet protocol (IP) packets are transferred through the UPF 166. The UPF 166 provides UE IP address allocation as well as other functions. The UPF 166 is configured to couple to IP Services 172. The IP Services 172 may include the Internet, an intranet, an IP Multimedia Subsystem (IMS), a PS Streaming Service, and/or other IP services.

Figure 2A:
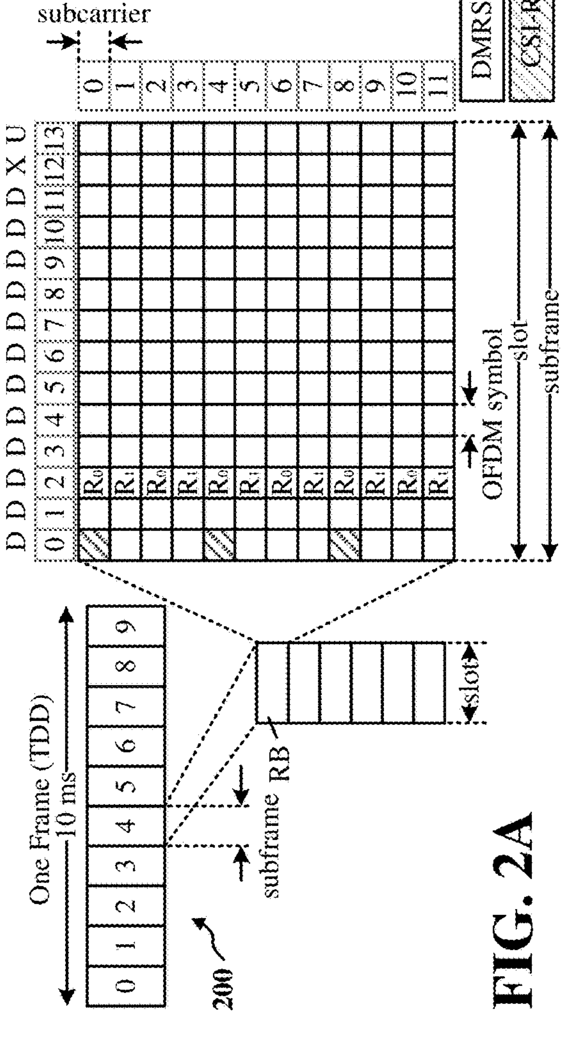
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.
Figure 2B:
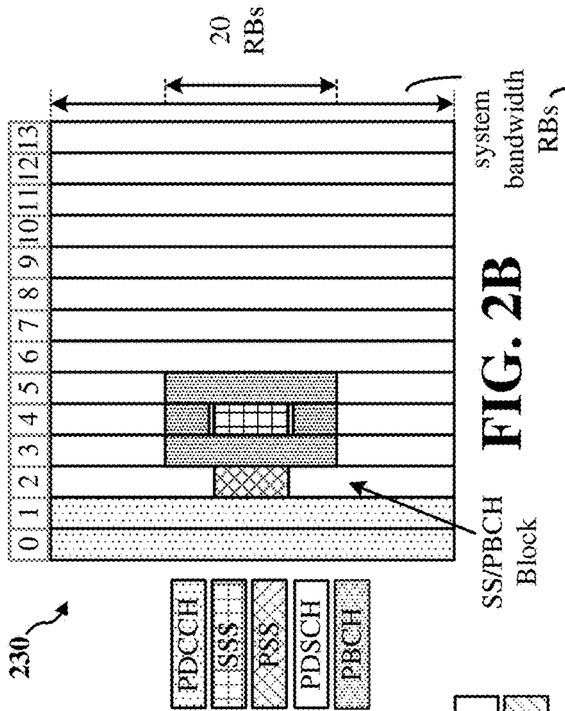
Figure 2C:
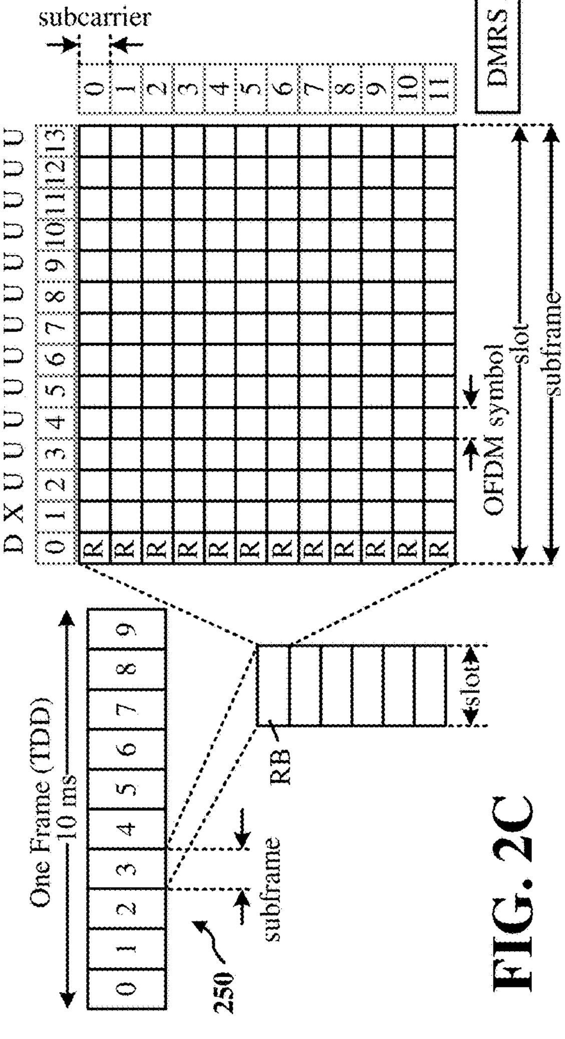
Figure 2D:
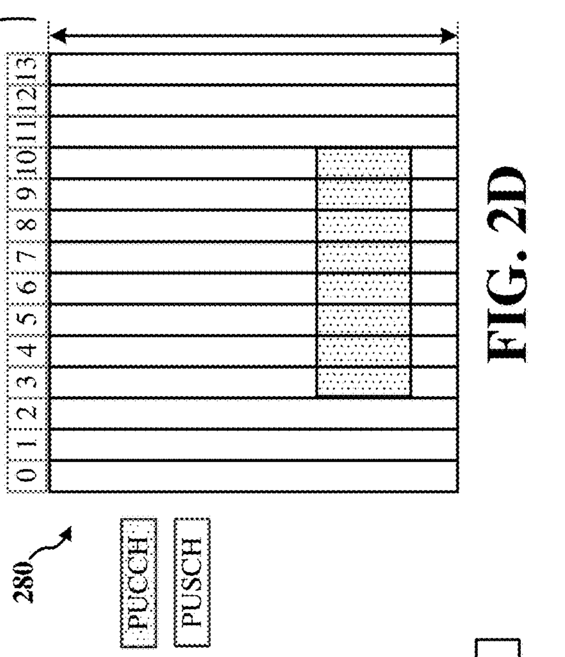

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
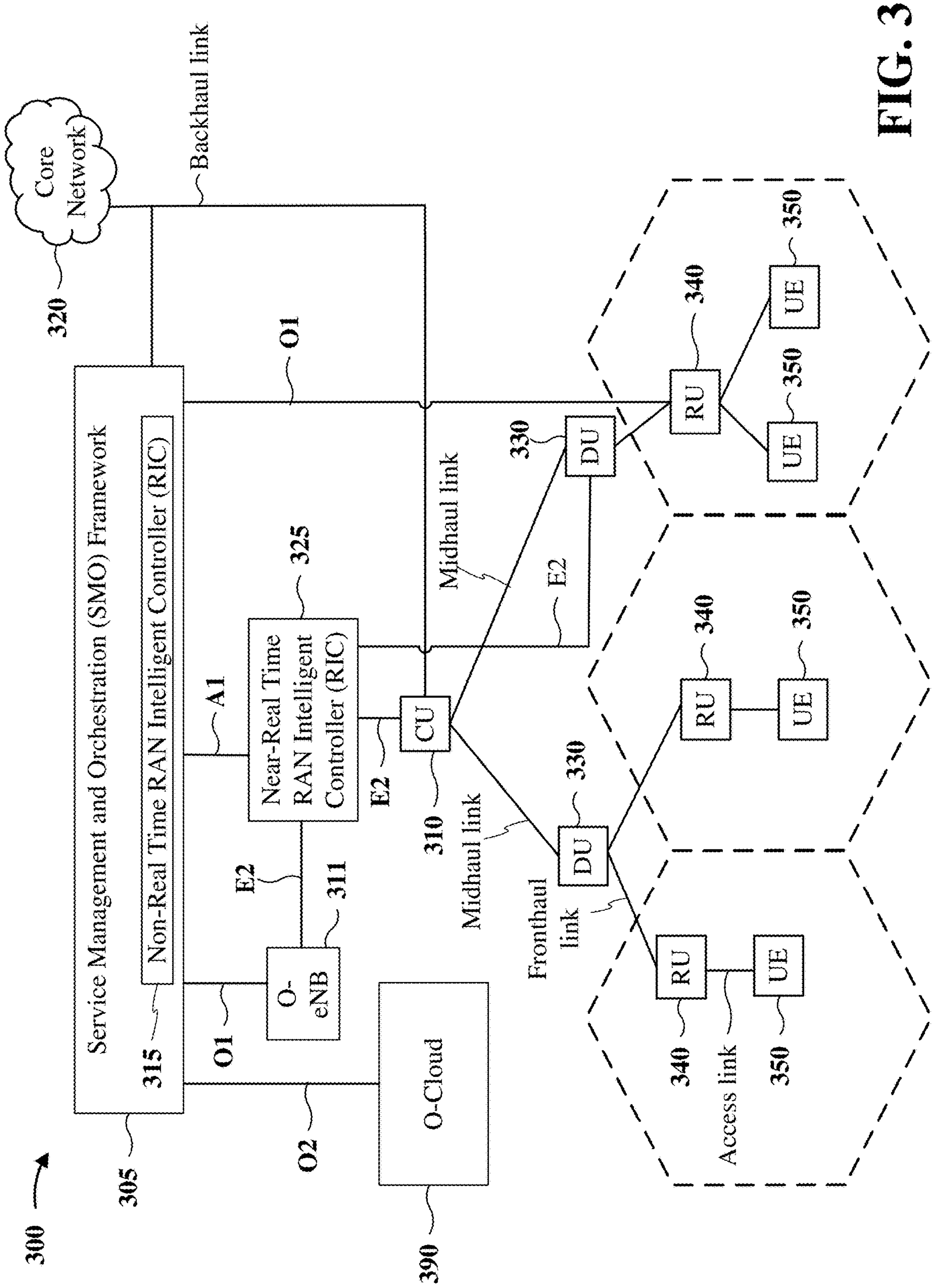
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E3 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O3 interface). Such virtualized network elements can include, but are not limited to, CUs 310, DUs 330, RUs 340 and Near-RT RICs 325. In some implementations, the SMO Framework 305 can communicate with a hardware aspect of a 5G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E3 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
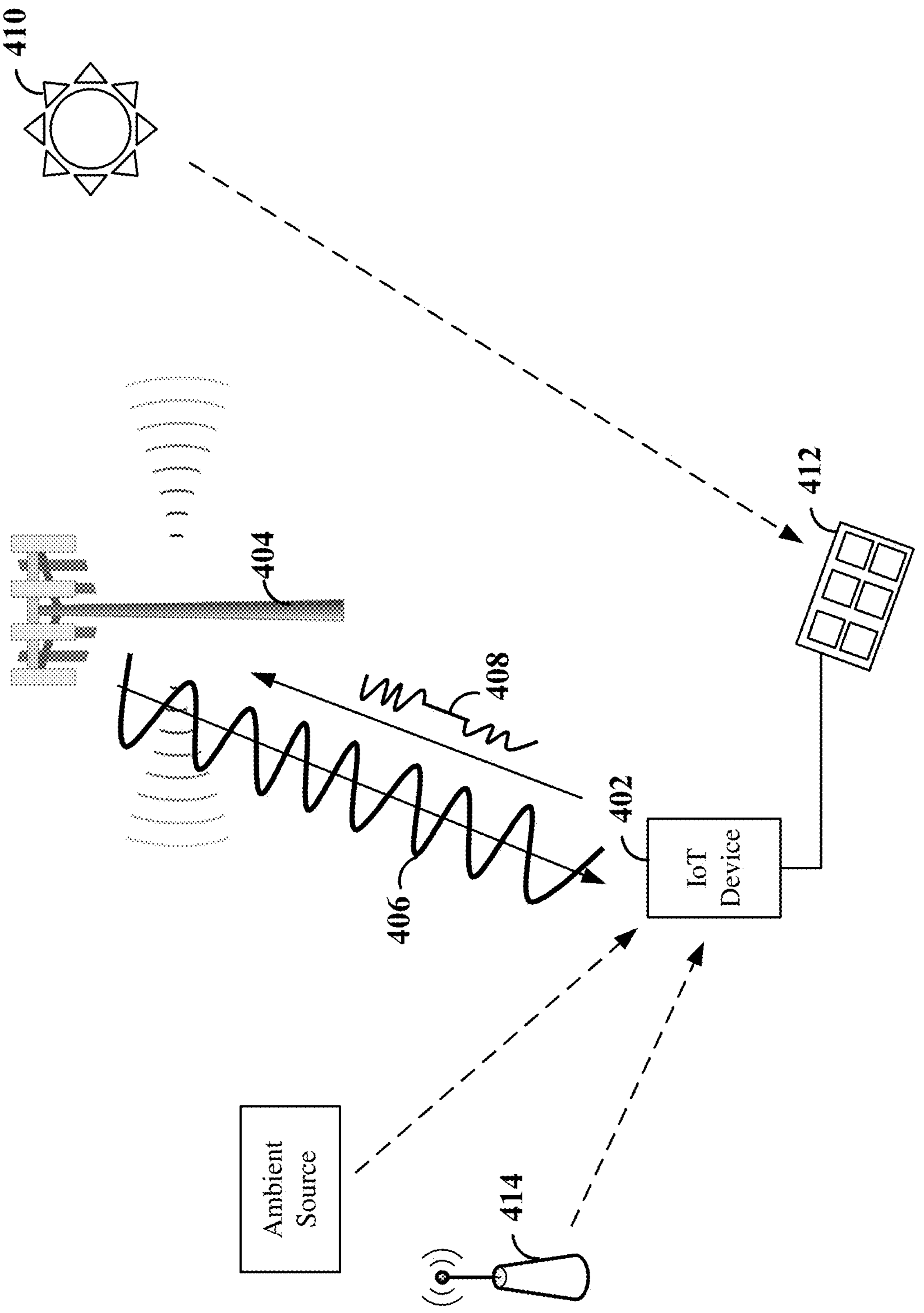
FIG. 4 is a diagram illustrating an example of ambient Internet of Things (IoT) communication according to some aspects.

FIG. 4 illustrates an example of ambient IoT communication according to some aspects. In the example shown in FIG. 4, an ambient IoT device 402 is in communication with a network entity 404 (e.g., reader or gNB, the latter being illustrated). The IoT device 402 may be, for example, a passive IoT device, such as RFID-type sensor/actuator (SA), an active IoT device, or a semi-active IoT device. The network entity 404 and IoT device 402 may utilize cellular (Uu) links for both wireless power transfer (WPT) and communication (e.g., downlink and/or uplink control and/or data information). For example, the network entity 404 may provide an energy transmission 406 that may be received by the IoT device 402. The energy transmission 406 may correspond to a waveform, such as a single-tone sinusoidal continuous wave (CW) signal or other suitable waveform. The energy transmission (e.g., CW signal) 406 may provide power to the transmit/receive circuitry or other energy harvesting circuitry within the IoT device 402. The IoT device 402 may be configured to backscatter and modulate at least a fraction of the CW signal 406 to enable an information-bearing signal 408 (e.g., backscattered signal) to be reflected from the IoT device 402 towards the network entity 404.

The network entity 404 may receive the backscattered signal 408 and decode the information included in the backscattered signal 408. However, the network entity 404 may experience self-interference of the backscattered signal 408 as a result of the simultaneous transmission of the CW signal 406. That is, a portion of the CW signal 406 may leak into the backscattered signal 408, thus resulting in self-interference between the CW signal 406 and the backscattered signal 408. As a result, the network entity 404 and IoT device 402 may employ various self-interference cancellation techniques to mitigate the self-interference experienced by the network entity 404. For example, the IoT device 402 may apply a frequency shift to the backscattered signal 408 to provide a frequency separation between the CW signal 406 and the backscattered signal 408 to aid in decoding of the backscattered signal 408.

In addition to CW WPT signals, the network entity 404 may further provide downlink control and/or data to the IoT device 402. In some examples, the IoT device 402 may utilize envelope detection (e.g., amplitude demodulation) to receive a downlink communication (e.g., control information and/or data) sent from network entity 404 to the IoT device 402. Envelope detection is a process that extracts the envelope (e.g., amplitude variation) of a modulated signal to demodulate and retrieve the information included in the modulated signal without performing further RF processing on the modulated signal.

In some examples, the ambient IoT device 402 may further be configured to harvest energy from other ambient energy sources, such as solar energy 410 with the use of a coupled solar panel 412, wireless energy transmitter devices 414 (e.g., devices that transmit CW signals or other suitable waveforms for WPT), and/or other ambient energy sources 416, such as television transmission sources, other RF signal sources, or other types of energy sources (e.g., heat, vibration, etc.).

Wireless energy transmitter (WET) devices 414 may be deployed to enhance the range of WPT. For example, to initiate energy harvesting (WPT) at an ambient IoT device 402, a receive power of −20 dBm for passive IoT devices and −35 dBm for semi-passive IoT devices may be needed. However, the receive power of signals from network entities 404 may be much lower (e.g., −65 dBm or lower). This may be due, for example, to the placement of network entities (e.g., gNBs) at large distances from IoT devices. For example, network entities may be placed at locations that achieve the desired communication requirements of the network based on various interference management techniques, which can result in a lower received power at the IoT device than needed for energy harvesting. By deploying WET devices 414 at a reduced distance from IoT devices 402, as compared to network entity devices (e.g., gNBs) 404, the received power at IoT devices 402 may be increased, thus meeting WPT requirements for IoT energy harvesting. In addition, due to the low complexity and reduced processing capability of WET devices 414, the cost of WET deployment can be minimized. For example, a WET device 414 may not be configured for connectivity, and therefore, may not include any additional processing capability other than CW signal generation and transmission. In other examples, a WET device 414 may include minimal processing capability (e.g., the WET device may include an RFID tag or similar functionality). Furthermore, WETs may be deployed in indoor settings (e.g., retail settings or factory environments), where electrical outlets for powering the WET devices are readily accessible.

Figure 5:
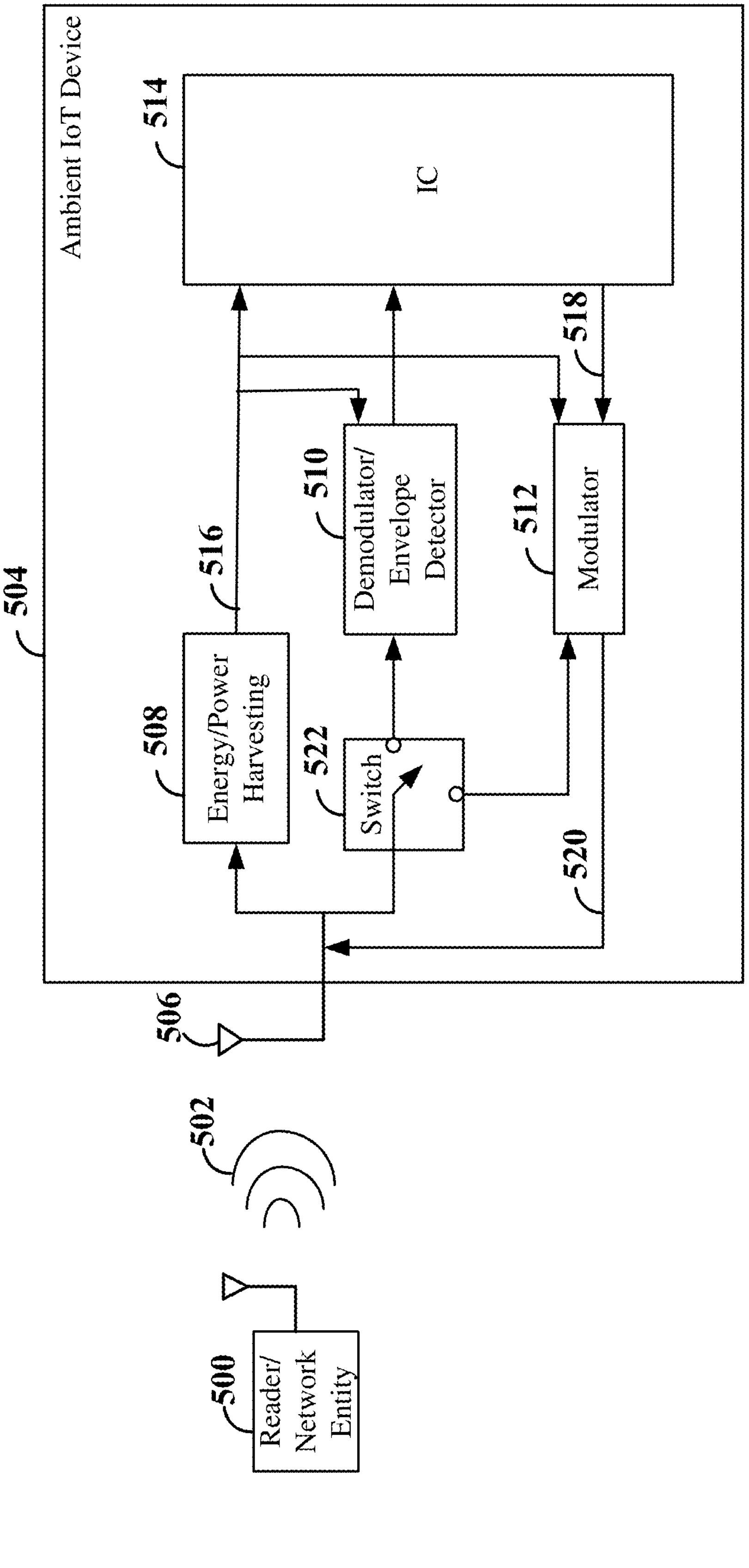
FIG. 5 is a diagram illustrating an example of a passive IoT device according to some aspects.

FIG. 5 is a diagram illustrating an example of a passive IoT device according to some aspects. In the example shown in FIG. 5, a transmitting (Tx) device 500, such as a network entity or RFID reader, transmits an RF signal 502 (e.g., a CW signal) to a receiving (Rx) device 504, such as an ambient IoT device. The ambient IoT device 504 may be, for example, a passive IoT device that lacks a battery or power source.

Once the RF signal 502 reaches the passive IoT device 504, the energy from the RF signal 502 travels through an antenna 506 on the passive IoT device 504 and is harvested via an energy/power harvesting circuit 508 that activates (supplies power to) other components of the passive IoT device 504. For example, the energy harvesting circuit 508 may supply power 516 to a demodulator/envelope detector 510, a modulator 512, and one or more other integrated circuits (ICs) 514, which may include, for example, one or more processors and/or one or more memories. In some examples, the IC 514, demodulator 510 and modulator 512 may be included within a microcontroller, microchip, or other suitable processing system on the passive IoT device 504. In some examples, the energy harvesting circuit 508 may include an internal antenna coil that is energized via electromagnetic induction.

The demodulator/envelope detector 510 may be configured to detect an envelope of the RF signal 502 to extract the information (e.g., downlink control and/or data) from the RF signal 502. In some examples, the extracted information may be provided to the IC 514 for further processing or storage. The modulator 512 may be configured to backscatter and modulate remaining energy from the RF signal 502 and to transmit the backscattered and modulated signal 520 to the network entity/reader 500 via the antenna 506. For example, the IC 514 may provide information bits 518 to the modulator 512 for modulation of the backscattered signal with the information bits 518 to produce the backscattered and modulated signal 520. In some examples, backscattering (reflection) may be based on a mismatch between the antenna 506 and a load impedance of the modulator 512. By varying the load impedance of the modulator 512, the reflection coefficient may vary according to a random sequence that modulates the backscattered signal with the information bits 518. The passive IoT device 504 may further include a switch 522 configured to switch between downlink communication (e.g., to receive and detect an envelope of an RF signal carrying downlink control and/or data) and uplink communication (e.g., to modulate and backscatter the RF signal).

Figure 6:
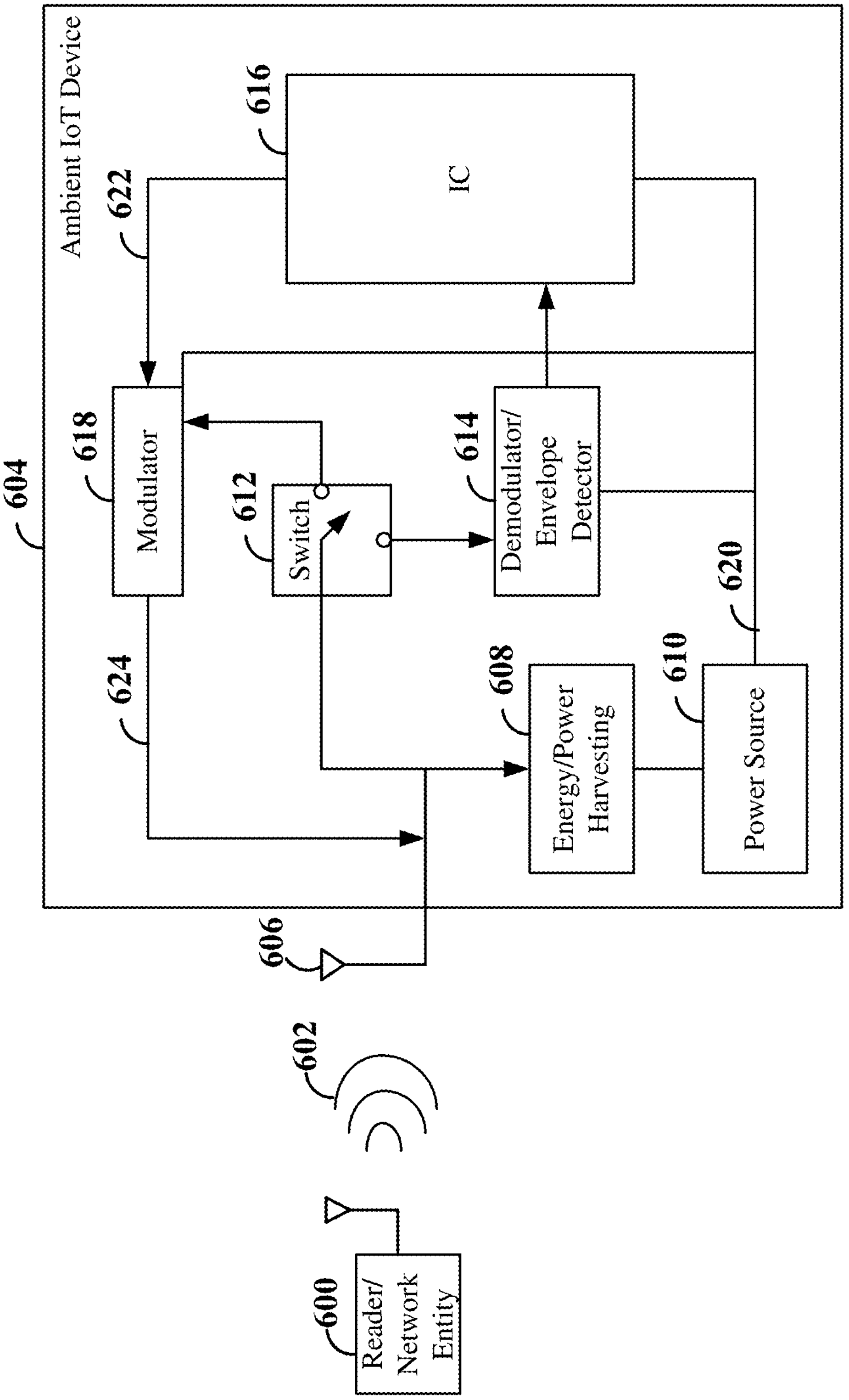
FIG. 6 is a diagram illustrating an example of an active IoT device with energy harvesting according to some aspects.

FIG. 6 is a diagram illustrating an example of an active IoT device with energy harvesting according to some aspects. In the example shown in FIG. 6, a transmitting (Tx) device 600, such as a network entity or RFID reader, transmits an RF signal 602 (e.g., a CW signal) to a receiving (Rx) device 604, such as an ambient IoT device. The ambient IoT device 604 may be, for example, an active IoT device that includes a battery or power source 610.

Once the RF signal 602 reaches the active IoT device 604, the energy from the RF signal 602 travels through an antenna 606 on the active IoT device 604 and is harvested via an energy/power harvesting circuit 608 to charge the power source 610. In some examples, the energy harvesting circuit 608 includes an impedance matching network and a rectifier/voltage multiplier configured to receive the RF signal 602 and convert the RF signal 602 into a direct current (DC) signal (e.g., output power 620) to charge the power source 610. The power source 610 may then supply power 620 to a demodulator/envelope detector 614, a modulator 618, and one or more other integrated circuits (ICs) 616, which may include, for example, one or more processors and/or one or more memories. In some examples, the IC 616, demodulator 614 and modulator 618 may be included within a microcontroller, microchip, or other suitable processing system on the active IoT device 604.

The demodulator/envelope detector 614 may be configured to detect an envelope of the RF signal 602 to extract the information (e.g., downlink control and/or data) from the RF signal 602. In some examples, the extracted information may be provided to the IC 616 for further processing or storage. The modulator 618 may be configured to backscatter and modulate remaining energy from the RF signal 602 and to transmit the backscattered and modulated signal 624 to the network entity/reader 600 via the antenna 606. For example, the IC 616 may provide information bits 622 to the modulator 618 for modulation of the backscattered signal with the information bits 622 to produce the backscattered and modulated signal 624. In some examples, backscattering (reflection) may be based on a mismatch between the antenna 606 and a load impedance of the modulator 618. By varying the load impedance of the modulator 618, the reflection coefficient may vary according to a random sequence that modulates the backscattered signal with the information bits 622. The active IoT device 604 may further include a switch 612 configured to switch between downlink communication (e.g., to receive and detect an envelope of an RF signal carrying downlink control and/or data) and uplink communication (e.g., to modulate and backscatter the RF signal).

Figure 7:
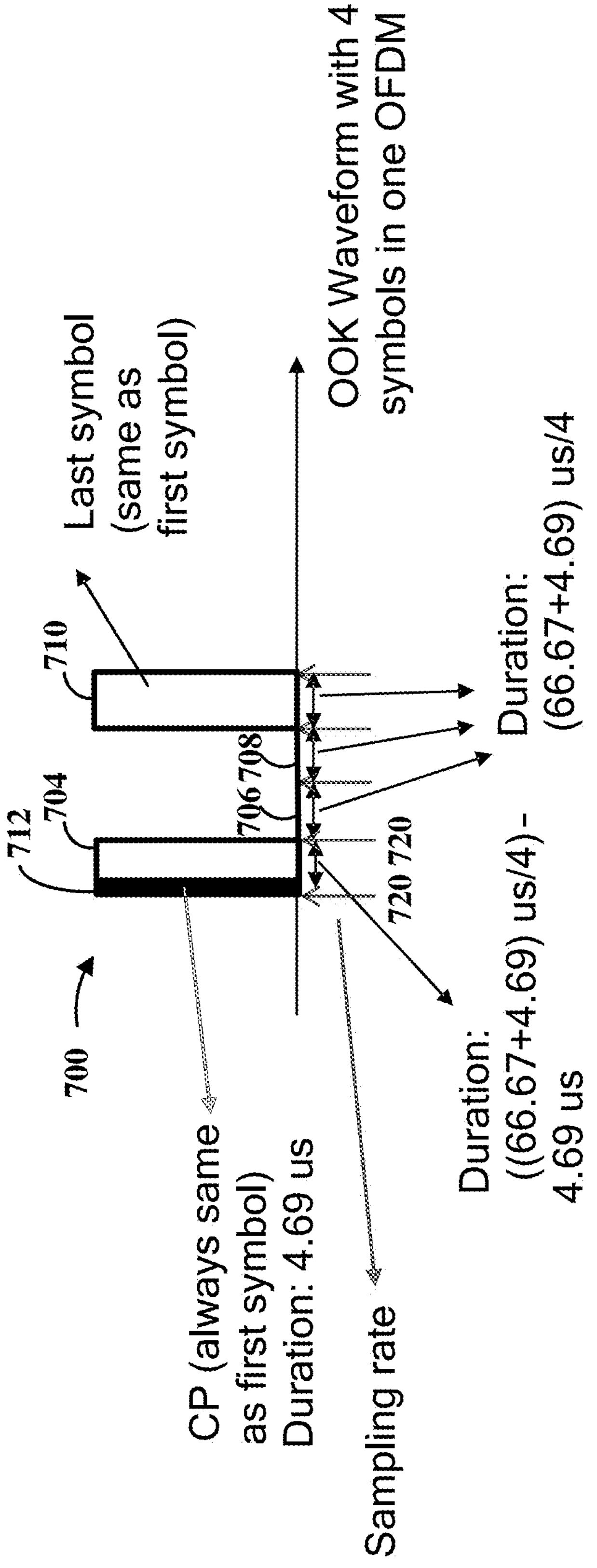
FIG. 7 is a diagram illustrating an example of a CP-transparent OOK OFDM waveform transmitted to an ambient IoT device from a network entity, according to some aspects.

To facilitate communication between the network entity/reader and the IoT device, a cyclic prefix (CP)-transparent on-off keying (OOK) orthogonal frequency-division multiplexing (OFDM) waveform may be utilized. FIG. 7 is a diagram illustrating an example of a CP-transparent OOK OFDM waveform transmitted to an ambient IoT device from a network entity/reader, according to some aspects. As can be seen in FIG. 7, in this example, an OOK OFDM waveform 700 includes M number of OOK symbol bits. In this example, M=4 and there are four OOK symbol bits: 704, 706, 708, and 710. It should be appreciated that any suitable number (M) of OOK symbols may be utilized. In one example, the network entity/reader may fix the last OOK symbol bit 710 to be the same as the first OOK symbol bit 704 in each OFDM symbol. In particular, the CP portion 712 will always be part of the first OOK symbol bit 704.

In this example, the network entity/reader may set each OOK symbol duration as: (OFDM symbol duration+CP length)/M, except the first symbol duration. The examples of the symbol durations can be seen as symbol durations arrows under the respective OOK symbols. Further, network entity/reader may set the first symbol duration as: ((OFDM symbol duration+CP length)/M−CP length). However, because the CP bit is part of the first symbol, the first symbol duration will be (OFDM symbol duration+CP length)/M, the same as the other symbols. In the examples shown in FIG. 7: M=4; OFDM symbol duration=66.67 us; and CP length=4.69 us. In this example, the OFDM symbol durations are: (66.67+4.69) us/4. Therefore, all of the of the OFDM symbol durations of the CP-transparent OOK OFDM waveform are the same length.

Based upon this configuration of the OFDM symbol durations of the CP-transparent OOK OFDM waveform by the network entity/reader, the IoT device can set a sampling rate 720 by a sampling clock to match the OOK OFDM symbol boundaries (including the CP), such that inter-symbol interference (ISI) issues do not occur. In this way, the pre-defined sampling rate 720 set by a sampling clock is set to be equal to the pre-defined duration of each symbol of the received CP-transparent OOK OFDM waveform, such that inter-symbol interference (ISI) issues do not occur.

As one example, in combination with the active ambient IoT device 604 of FIG. 6, reader/network entity 600 transmits an RF signal 602 that is received by antenna 606 of active ambient IoT device 604. The RF signal is configured as the CP-transparent OOK OFDM waveform 700 including a CP 712 in the first OOK symbol bit 704 of FIG. 7. The IC 616 is configured to sample OOK OFDM symbols (704, 706, 708, 710) from the demodulator 614 of the received OOK OFDM waveform at the pre-defined sampling rate 720 set by the sampling clock set by the IC 616. As previously described, the pre-defined sampling rate is based upon a pre-defined duration of the symbols of the received CP-transparent OOK OFDM waveform 700 from the reader/network entity that are all the same, wherein, the pre-defined duration of each of the symbols of the received CP-transparent OOK OFDM waveform is defined such that a last OOK OFDM symbol duration is set to be the same as a first OOK OFDM symbol duration, in which, the first OOK OFDM symbol includes the CP 712. In particular, the pre-defined sampling rate set by a sampling clock of IC 616 is set to be equal to the pre-defined duration of each symbol of the received CP-transparent OOK OFDM waveform, such that inter-symbol interference (ISI) issues do not occur.

As another example, in combination with the passive ambient IoT device 504 of FIG. 5, reader/network entity 500 transmits an RF signal 502 that is received by antenna 506 of passive ambient IoT device 604. The RF signal is configured in the CP-transparent OOK OFDM waveform 700 including a CP 712 in the first OOK symbol bit 704 of FIG. 7. The IC 514 is configured to sample OOK OFDM symbols (704, 706, 708, 710) from the demodulator 510 of the received CP-transparent OOK OFDM waveform at the pre-defined sampling rate 720 set by the sampling clock set by the IC 516. As previously described, the pre-defined sampling rate is based upon a pre-defined duration of the symbols of the received OOK OFDM waveform from the reader/network entity that are all the same, wherein, the pre-defined duration of each of the symbols of the received CP-transparent OOK OFDM waveform is defined such that a last OOK OFDM symbol duration is set to be the same as a first OOK OFDM symbol duration, in which, the first OOK OFDM symbol includes the CP 712.

Figure 8:
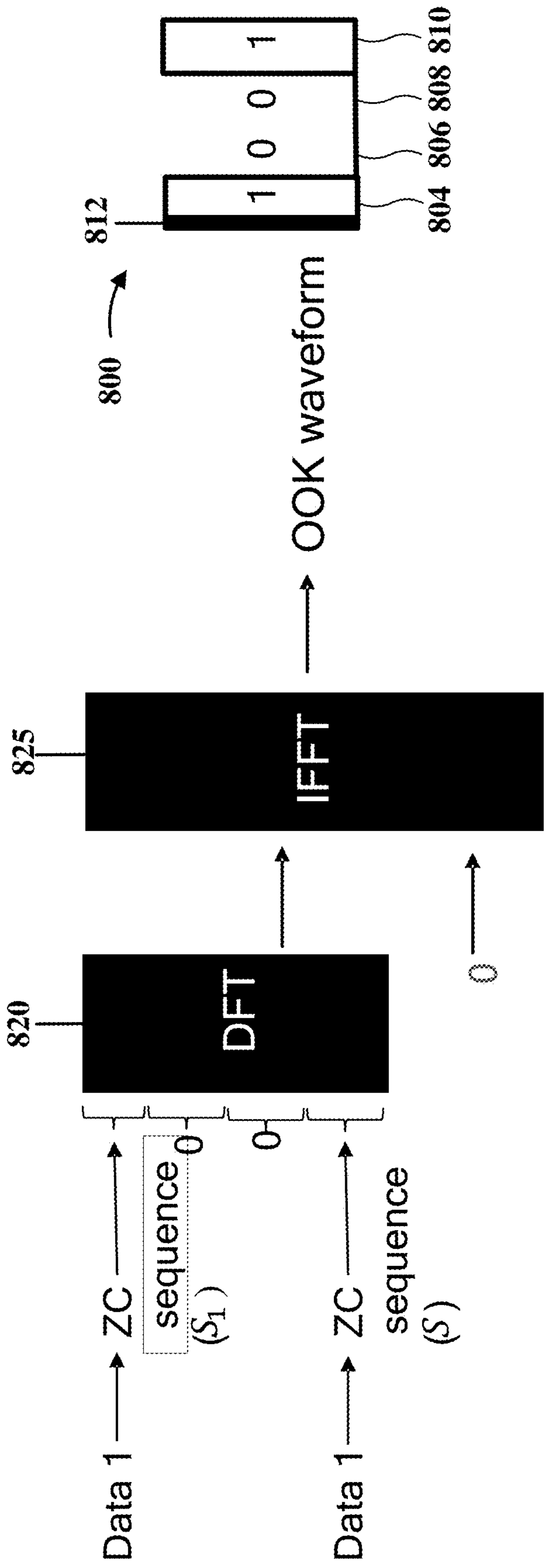
FIG. 8 is a diagram illustrating an example of generating the CP-transparent OOK OFDM waveform utilizing a ZC sequence from a network entity, according to some aspects.

In various aspects, the CP-transparent OOK OFDM waveform may be generated by a network entity using a Zadoff-Chu (ZC) sequence that is transmitted to an ambient IoT device. FIG. 8 is a diagram illustrating an example of generating the CP-transparent OOK OFDM waveform utilizing a ZC sequence from a network entity, according to some aspects. In order to generate the CP-transparent OOK OFDM waveform, a ZC sequence length for ON duration is selected, such that it results in a time domain symbol period of —(OFDM symbol duration+CP length)/4. For example, with N number of subcarriers, L as CP samples, x number of ambient-IoT resource element (RE) allocation, M number of OOK symbols for OFDM, the ZC sequence length will be: $S \approx (x/M)*((N+L)/N)$. It should be noted that this equation is applied to all the OOK symbols except the first symbol. The Zadoff-Chu (ZC) sequence length is set for an ON duration for intermediate OOK symbols of the OOK OFDM waveform. Briefly, FIG. 8 shows the CP-transparent OOK OFDM waveform 800 with first OOK OFDM symbol 804, second OOK OFDM symbol 806, third OOK OFDM symbol 808, and fourth OOK OFDM symbol 810.

For the first symbol 804, ZC sequence length is adjusted to a time domain symbol period of −((OFDM symbol duration+CP length)/M−CP length) to account for the CP 812 length. Therefore, for the first symbol 804, ZC sequence length for first symbol is: $S_1 \approx (x/M)$. However, the ZC sequence length of the other OOK symbols 806, 808, 810 can be truncated to match the ZC length for the first OOK symbol 804. It should be noted that for the CP-transparent OFDM OOK waveform 800, only a certain power level needs to be maintained during the ON bit, and the phase and amplitude variation between CP and first symbol do not need to be matched.

As can be seen in FIG. 8, to generate the CP-transparent OOK OFDM waveform 800 by a network entity, Data 1 is inputted into a discrete Fourier transform (DFT) 820. As can be seen, ZC sequence length for first symbol $S_1$ ($S_1=(x/M)$) is inputted to DFT 820 and ZC sequence lengths (S) for the other symbols (second symbol, third symbol, and fourth symbol) are inputted into DFT 820. The output of DFT 820 is plugged in as an input to inverse fast Fourier transform (IFFT) 825 and the output IFFT 825 is the CP-transparent OOK OFDM waveform 800. It should be noted that this is the same as CP-transparent OOK OFDM waveform 700 discussed with reference to FIG. 7.

Figure 9:
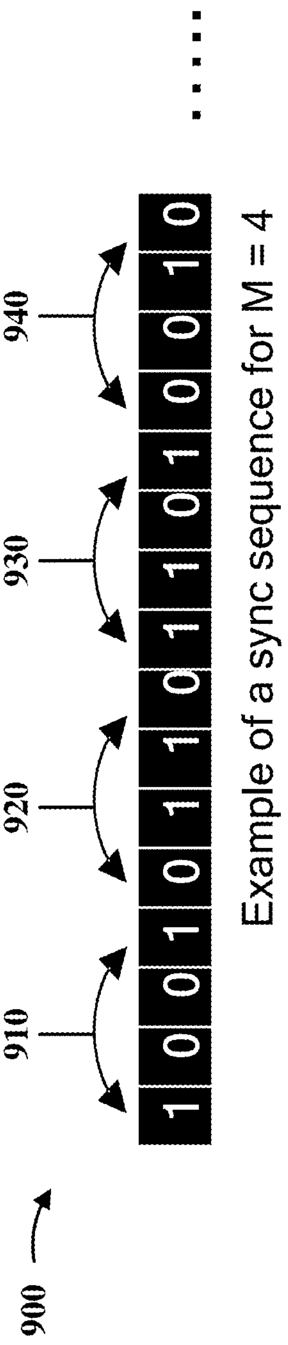
FIG. 9 is a diagram illustrating an example of generating a Sync sequence signal from a network entity, according to some aspects.

In various aspects, a CP-transparent OOK OFDM waveform may be generated for a synchronization (Sync) sequence signal from a network entity that is transmitted to an ambient IoT device. FIG. 9 is a diagram illustrating an example of generating the Sync sequence signal from the network entity, according to some aspects. The Sync signal sequence may consider the constraints set forth in FIG. 9 to transmit with the CP-transparent OOK OFDM waveform. As shown in FIG. 9, one of the constraints is to match first and last OOK bits within each OFDM signal duration. In this example, there are M OOK bits per OFDM symbol, and a sync sequence is designed that satisfies: ((i−1)*M+1)th bit must match with (i*M)^th bit, for i=1, 2, 3 . . . .

In this example shown in FIG. 9, M=4. As can be seen in FIG. 9, a sync sequence is displayed in which: OFDM 1 910 includes OOK bits 1001; OFDM 2 920 includes OOK bits 0110; OFDM 3 930 includes OOK bits 1101; and OFDM 4 940 includes OOK bits 0010. As can be seen, the first and last symbols of each received OOK OFDM waveform generated by the network entity and received by the ambient IoT device include matching bits from the synchronization sequence signal. It should be noted that, when the sync sequence is selected by the network entity to satisfy this constraint, then the IoT device may not need to discard CP and can directly proceed with detection at a sampling rate of: (OFDM symbol duration+CP length)/M, as previously described.

Figure 10:
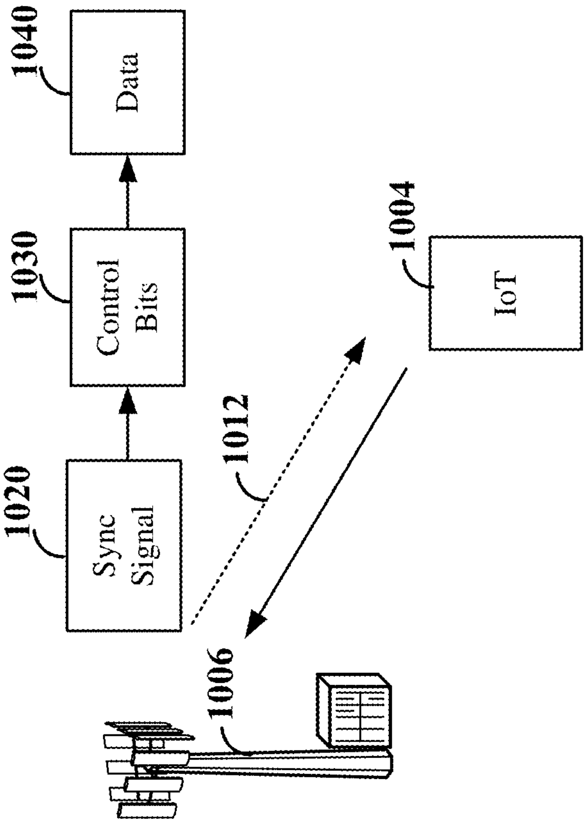
FIG. 10 is a diagram illustrating an example of a process for an ambient IoT device to receive data utilizing the CP-transparent OOK OFDM waveform from a network entity, according to some aspects.

In various aspects, the ambient IoT device may utilize the CP-transparent OOK OFDM waveform from the network entity for the receipt of data. FIG. 10 is a diagram illustrating an example of a process for an ambient IoT device 1004 to receive data utilizing the CP-transparent OOK OFDM waveform 1112 from the network entity 1006, according to some aspects. It should be appreciated that ambient IoT device 1004 may be, for example, an active, passive, or semi-passive IoT device and the network entity 1006 may be, for example, an RFID reader or base station (e.g., gNB, including aggregated or disaggregated base station configurations), the latter being illustrated.

To begin with, network entity 1006 may first transmit a synchronization signal 1020 in the CP-transparent OOK OFDM waveform 1012 that may be designed with the constraints of the CP-transparent OOK OFDM waveform, as described with reference to FIG. 9, in which in the sync signal 900, the first and last symbols of each received OOK OFDM waveform generated by the network entity and received by the ambient IoT device include matching bits. The CP-transparent OOK OFDM waveform may be created as described with reference to FIG. 7, as one example. It should be appreciated that the synchronization signal does have to be transmitted in the CP-transparent OOK OFDM waveform format.

After the synchronization signal has been transmitted by the network entity 1006 to the ambient IoT device 1004, and the ambient IoT device 1004 is receiving and processing signals from the network entity 1006, the network entity 1006 may transmit control bits 1030 to the ambient IoT device 1004. The control bits may be transmitted in CP-transparent OOK OFDM waveform 1012 that may be created as described with reference to FIG. 7, as one example. Using the control bits, ambient-IoT device 1004 knows whether the data is transmitted using the CP-transparent OOK OFDM waveform or a regular OFDM waveform.

In one example, there could be two different sync signals and each sync signal corresponds to a particular data waveform—after decoding sync signal, ambient-IoT device knows the data waveform (e.g., no need for control bits in this option). Also, it should be appreciated that, in another example, in the case of IoT data being transmitted using CP-transparent OOK OFDM waveform 1012, network entity 1006 may indicate that the IoT device use the CP-transparent OOK OFDM waveform 1012 with its pre-configured setting using a system information block (SIB). It should also be noted, as shown FIG. 10, that ambient IoT device 1004 can communicate uplink data to network entity 1006.

If the ambient IoT device 1004, after detecting the sync signal 1020 and the control bits 1030, selects the control bits 1030, then the ambient IoT device 1004 decodes the data 1040, according to the control bits 1030, by utilizing the CP-transparent OOK OFDM waveform 1012. The sampling rate may be selected by the ambient IoT device 1004 to be (OFDM duration+CP)/Number of OOK symbols, as previously described with reference to OOK OFDM waveform 700 of FIG. 7. In particular, after detecting the sync signal 1020 and the control bits 1030, and selecting the control bits to proceed in decoding data, ambient IoT device 1004 applies the new decoding process in decoding data. It should be noted that the control bits 1030 indicate to the ambient IoT device 1004 that the first symbol portion and the last symbol portion of the CP-transparent OOK OFDM waveform 1012 are the same, such that the IoT device may discard the last symbol portion. Therefore, data from the first and subsequent symbol portions may be utilized and data from the last symbol portion may be discarded. Accordingly, based upon the received control bit to indicate decoding of the received CP-transparent OOK OFDM waveform 1012 for data, the ambient IoT devices 1004 applies decoding of the received CP-transparent OOK OFDM waveform 1012 at the pre-defined sampling rate.

In particular, the sampling rate is selected by the ambient IoT device 1004 to be (OFDM duration+CP)/Number of OOK symbols, as previously described with reference to the OOK OFDM waveform 700 of FIG. 7. As previously described, the pre-defined sampling rate of the ambient IoT device 1004 is based upon a pre-defined duration of the symbols of the received CP-transparent OOK OFDM waveform 1012 from the network entity 1006 (and defined by network entity 1006) that are all the same, wherein, the pre-defined duration of each of the symbols of the received CP-transparent OOK OFDM waveform 1012 is defined such that a last OOK OFDM symbol duration is set to be the same as a first OOK OFDM symbol duration, in which, the first OOK OFDM includes the CP, as previously described with reference with reference to the OOK OFDM waveform 700 of FIG. 7. Because of this, there is no CP removal used by the ambient IoT device 1004. In this way, the pre-defined sampling rate set by the sampling clock of the ambient IoT device 1004 is set to be equal to the pre-defined duration of each symbol of the received OOK OFDM waveform, such that inter-symbol interference (ISI) issues do not occur.

In one example, during IoT data transmission, the last data bit in each OFDM symbol of the CP-transparent OOK OFDM waveform 1012 may be the same as the first one. Therefore, the first bit may have the CP and data and the last bit will also have repeat data. This may result in a rate loss of (1/M), and the new rate will be: R*((M−1)/M), assuming R as the coding rate. However, due to the repetition of first bit, the first bits in each OFDM will have a higher reliability over the other transmitted bits and can be used for the data requiring high reliability, such as, ACK bits and control bits.

In some examples, in a simple detection, the ambient IoT device 1004 can discard the last bit in each OFDM symbol of the CP-transparent OOK OFDM waveform 1012 and use the average received power over first and last OOK symbol in each OFDM for detecting the first bit. Additionally, it should be appreciated that ambient IoT device 1004 does not have to accept the control bits and process the CP-transparent OOK OFDM waveform 1012 with the pre-defined sampling rates. The ambient IoT device 1004 can decode the data from the CP-transparent OOK OFDM waveform 1012 utilizing its standard decoding processing techniques. For example, a high-powered ambient IoT device 1004 that can sample at a very high rate may decode the data from the CP-transparent OOK OFDM waveform 1012 utilizing its standard decoding processing techniques and decodes at such a high-rate that CP issues are not a concern to the high-powered ambient IoT device 1004.

Figure 11:
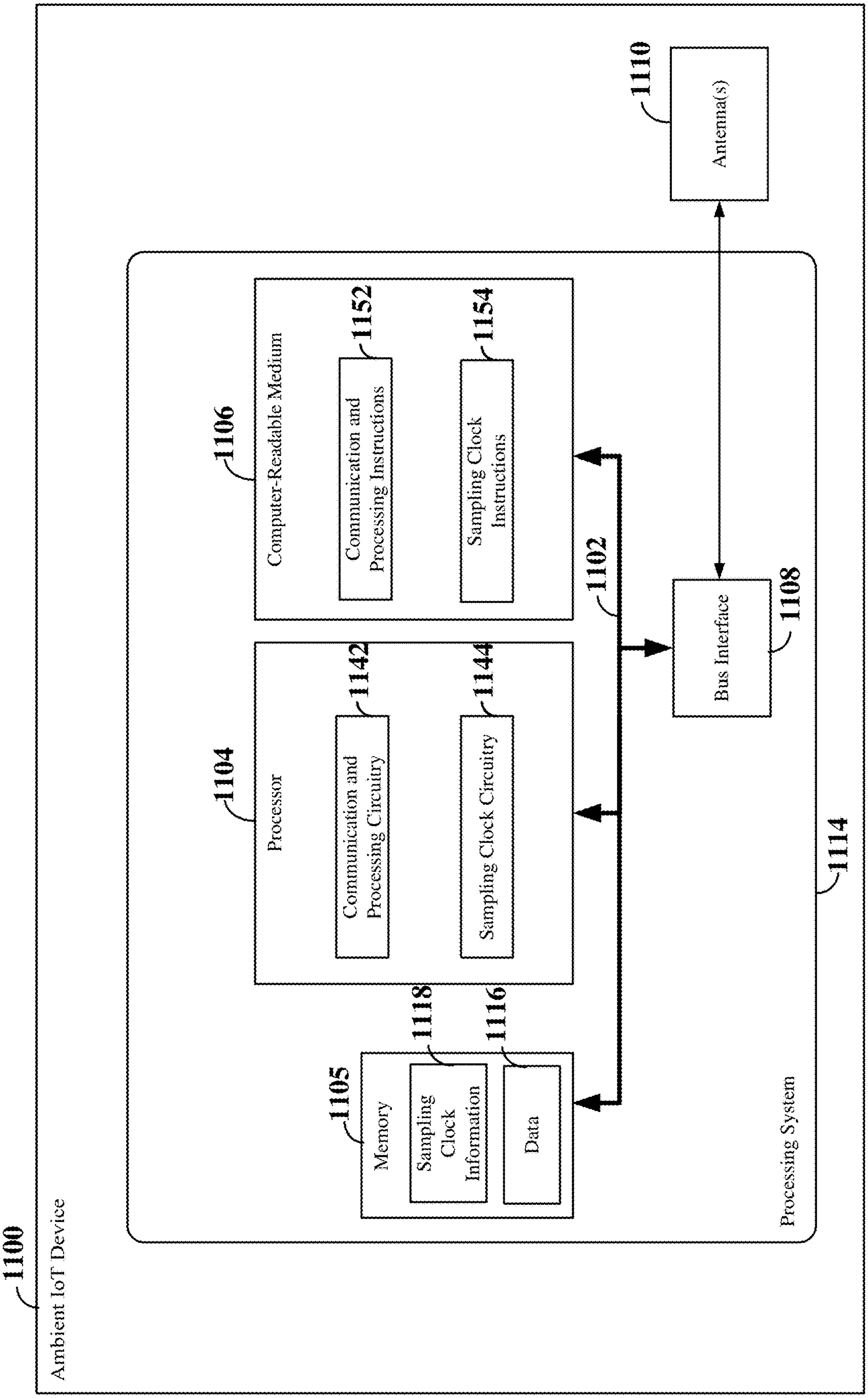
FIG. 11 is a block diagram illustrating an example of a hardware implementation for an ambient Internet of Things (IoT) device employing a processing system, according to some aspects.

FIG. 11 is a block diagram illustrating an example of a hardware implementation for an ambient Internet of Things (IoT) device employing a processing system, according some aspects. For example, the ambient IoT device 1100 may correspond to any of the IoT devices shown and described above in reference to FIGS. 1, 4, 5, 6, and/or 7-10, and may include the circuitry shown in any of FIGS. 5 and/or 6.

In accordance with various aspects of the disclosure, an element, or any portion of an element, or any combination of elements may be implemented with a processing system 1114 that includes one or more processors 1104. The processing system 1104 may include a bus interface 1108, a bus 1102, memory 1105, a processor 1104, and a computer-readable medium 1106.

The ambient IoT device 1100 may be implemented with the processing system 1114 that includes the one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the ambient IoT device 1100 may be configured to perform any one or more of the functions described herein. That is, processor 1104 may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1103 may also link various other circuits such as timing sources, peripherals, voltage regulators, and power management circuits, which are well known in the art, and therefore, will not be described any further. A bus interface 1108 provides an interface between the bus 1102 and at least one antenna 1110. The antenna 1110 provides a means for communicating with various other apparatus over a transmission medium (e.g., air interface).

The processor 1104 is responsible for managing the bus 1102 and general processing, including the execution of software stored on the computer-readable medium 1106. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software, when executed by the processor 1104, causes the processing system 1114 to perform the various functions described below for any particular apparatus. The computer-readable medium 1106 and the memory 1105 may also be used for storing data that is utilized by the processor 1104 when executing software. For example, the memory 1105 may store sampling clock information and/or data information 1116.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system.

The processor 1104, as utilized in an ambient IoT device 1100, may be used to implement any one or more of the processes described herein. In some examples, the memory 1105 may store one or more of data 1116 and/or sampling clock information 1118 that may be utilized by the processor 1104 when executing software.

In some aspects of the disclosure, the processor 1104 may include circuitry configured for various functions. For example, the processor 1104 may include communication and processing circuitry 1142, configured to communicate with a network entity (e.g., an RFID reader or an aggregated or disaggregated base station, such as a gNB or eNB). In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). In some examples, the communication and processing circuitry 1142 may include low complexity circuitry for baseband or near-baseband processing with minimal RF processing. In some examples, the communication and processing circuitry 1142 may include low complexity circuitry, such as envelope detection circuitry.

In some implementations where the communication involves receiving information, the communication and processing circuitry 1142 may receive a downlink transmission from the antenna 1110, process (e.g., demodulate/decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the antenna 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting).

In one example, the communication and processing circuitry 1142 may be configured to receive a CP-transparent OOK OFDM waveform including a cyclic prefix (CP) via antenna 1110. Further, the communication and processing circuitry 1142 may be configured to sample symbols of the received CP-transparent OOK OFDM waveform at a pre-defined sampling rate. The pre-defined sampling rate is based upon a pre-defined duration of the symbols of the received OOK OFDM waveform, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP.

In some examples, the pre-defined duration of each symbol of the received OOK OFDM waveform is equal to the duration of an OFDM symbol including a CP length divided by the number of OOK OFDM symbols, as previously described. In some examples, the pre-defined sampling rate is set to be equal to the pre-defined duration of each symbol of the received OOK OFDM waveform, as previously described. In some examples, a Zadoff-Chu (ZC) sequence length is set for an ON duration for intermediate OOK symbols of the OOK OFDM waveform, as previously described. In some examples, a ZC sequence length is set for the first symbol of the OOK OFDM waveform to account for CP length, as previously described. In some examples, the first and last symbols of the received OOK OFDM waveform include matching bits for a synchronization sequence signal, as previously described.

In some examples, the communication and processing circuitry 1142 is further configured to: receive a control bit to indicate decoding of the received OOK OFDM waveform for data. In some examples, the communication and processing circuitry 1142 is further configured to: based upon the received control bit to indicate decoding of the received OOK OFDM waveform for data, applying decoding of the received OOK OFDM waveform at the pre-defined sampling rate, as previously described.

In some examples, the communication and processing circuitry 1142 may include the modulator/demodulator shown in any of FIGS. 5 and/or 6. The communication and processing circuitry 1142 may further be configured to execute communication and processing instructions (software) 1152 stored in the computer-readable medium 1506 to implement one or more of the functions described herein.

As previously described, a network entity transmits an RF signal that is received by the antenna 1110 of ambient IoT device 1100. The RF signal is configured as the CP-transparent OOK OFDM waveform 700 including a CP 712 in the first OOK symbol bit 704 (as shown in FIG. 7). The communication and processing circuitry 1142 is configured to sample OOK OFDM symbols (704, 706, 708, 710) from the demodulator of the received OOK OFDM waveform at the pre-defined sampling rate 720 set by the sampling clock set by the processor 1104. As previously described, the pre-defined sampling rate is based upon a pre-defined duration of the symbols of the received OOK OFDM waveform 700 from the reader/network entity that are all the same, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP. In particular, the pre-defined sampling rate set by a sampling clock of processor 1104 is set to be equal to the pre-defined duration of each symbol of the received OOK OFDM waveform, such that inter-symbol interference (ISI) issues do not occur.

In this example implementation, processor 1104 may further include sampling clock circuitry 1144. The sampling clock circuitry 1144 may further be configured to operate together with the communication and processing circuitry 1142 to sample symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP. The sampling clock circuitry 1141 may further be configured to execute sampling clock instructions (software) 1154 stored in the computer-readable medium 1106 to implement one or more of the functions described herein.

Figure 12:
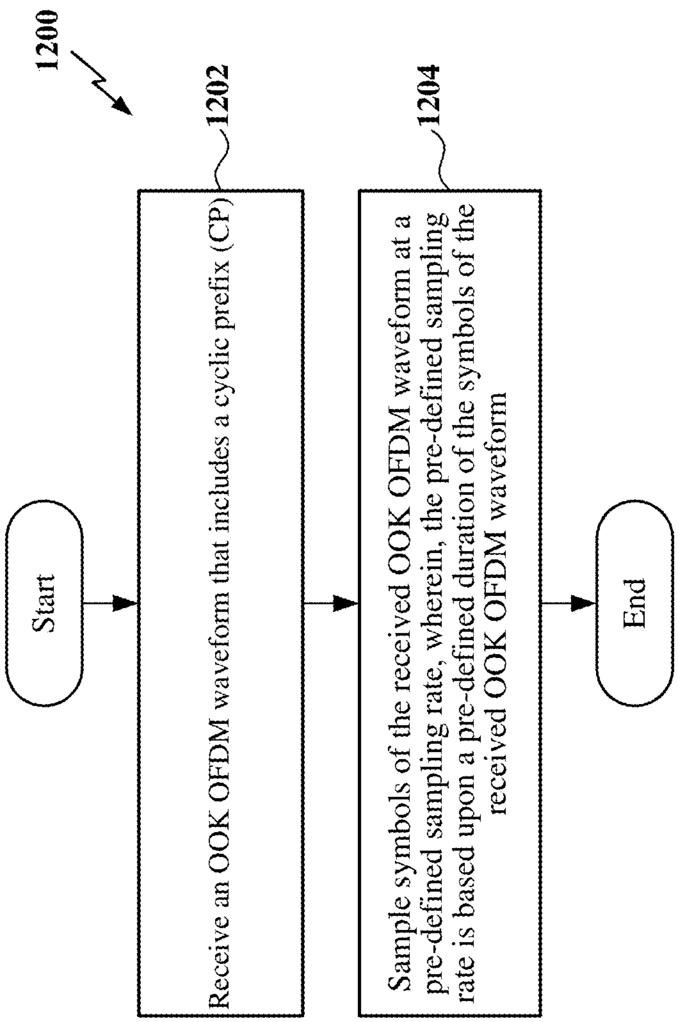
FIG. 12 is a flow chart of an exemplary process for enhancing communication between network entities and ambient IoT devices utilizing a CP-transparent OOK OFDM waveform, according to some aspects

FIG. 12 is a flow chart of an exemplary process 1200 for enhancing communication between network entities and ambient IoT devices utilizing a CP-transparent OOK OFDM waveform, according to some aspects. As described below, some or all illustrated features may be omitted in a particular implementation within the scope of the present disclosure, and some illustrated features may not be required for implementation of all examples. In some examples, the method may be performed by the ambient IoT device 1100, as described above and illustrated in FIG. 11, by a processor or processing system, or by any suitable means for carrying out the described functions.

At block 1202, the ambient IoT device may receive an OOK OFDM waveform that includes a cyclic prefix (CP). For example, the communication and processing circuitry 1142 together with the antenna 1110, shown and described above in connection with FIG. 11, may provide a means to receive the OOK OFDM waveform that includes the CP.

At block 1204, the ambient IoT device may sample symbols of the received OOK OFDM waveform at a pre-defined sampling rate. The pre-defined sampling rate is based upon a pre-defined duration of the symbols of the received OOK OFDM waveform, wherein, the pre-defined duration of each of the symbols of the received OOK OFDM waveform is defined such that a last OOK OFDM symbol duration is set to be the same as a first OOK OFDM symbol duration, in which, the first OOK OFDM symbol includes the CP. For example, the communication and processing circuitry 1142 (in some examples together with the sampling clock circuitry 1144), shown and described above in connection with FIG. 11, may provide a means for sampling the received OOK OFDM waveform at a pre-defined sampling rate.

In some examples, the pre-defined duration of each symbol of the received OOK OFDM waveform is equal to the duration of an OFDM symbol including a CP length divided by the number of OOK OFDM symbols, as previously described. In some examples, the pre-defined sampling rate is set to be equal to the pre-defined duration of each symbol of the received OOK OFDM waveform, as previously described. In some examples, a Zadoff-Chu (ZC) sequence length is set for an ON duration for intermediate OOK symbols of the OOK OFDM waveform, as previously described. In some examples, a ZC sequence length is set for the first symbol of the OOK OFDM waveform to account for CP length, as previously described. In some examples, the first and last symbols of the received OOK OFDM waveform include matching bits for a synchronization sequence signal, as previously described.

In some examples, a control bit is received by the ambient IoT device to indicate decoding of the received OOK OFDM waveform for data. In some examples, based upon the received control bit to indicate decoding of the received OOK OFDM waveform for data, decoding of the received OOK OFDM waveform at the pre-defined sampling rate is applied by the ambient IoT device, as previously described.

In one configuration, the IoT device 1100 includes: means for receiving an on-off keying (OOK) orthogonal frequency-division multiplexing (OFDM) waveform including a cyclic prefix (CP); and means for sampling symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 4-10, and/or 11 utilizing, for example, the processes and/or algorithms described herein in relation to FIG. 12.

Figure 13:
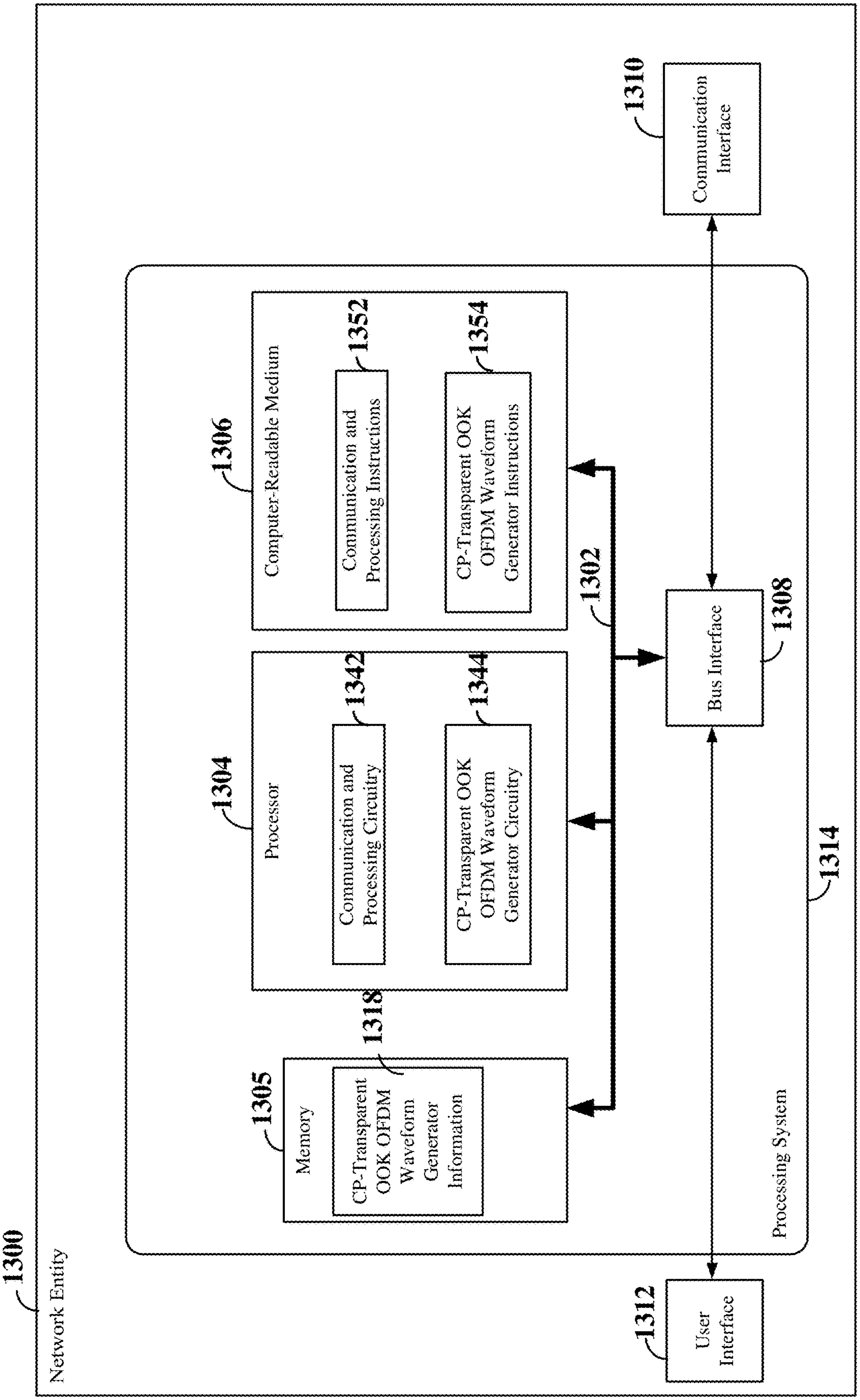
FIG. 13 is a block diagram illustrating an example of a hardware implementation for an exemplary network entity employing a processing system, according to some aspects.

FIG. 13 is a block diagram illustrating an example of a hardware implementation for an exemplary network entity 1300 employing a processing system 1314, according to some aspects. For example, the network entity 1300 may correspond to any of the network entities (e.g., aggregated or disaggregated base stations) shown in any one or more of FIGS. 1, 3, and/or 4.

In accordance with various aspects of the disclosure, an element, or any portion of an element, or any combination of elements may be implemented with a processing system 1314 that includes one or more processors 1304. The processing system 1314 may be substantially the same as the processing system 1114 illustrated in FIG. 11, including a bus interface 1308, a bus 1302, memory 1305, a processor 1304, and a computer-readable medium 1306. Furthermore, the network entity 1300 may include an optional user interface 1312 and a communication interface (e.g., a transceiver and one or more antenna arrays). The processor 1304, as utilized in a network entity 1300, may be used to implement any one or more of the processes described herein. In some examples, the memory 1305 may store one or more of CP-transparent OOK OFDM waveform generator information 1318 that may be utilized by the processor 1304 when executing software (e.g., CP-transparent OOK OFDM waveform generation instructions (software) 1354 stored in the computer-readable medium 1306 to implement one or more of the functions described herein).

The processor 1304 may include communication and processing circuitry 1342 configured to communicate with one or more ambient IoT devices. In some examples, the communication and processing circuitry 1342 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1342 may include one or more transmit/receive chains.

In some implementations where the communication involves receiving information, the communication and processing circuitry 1342 may obtain information from a component of the network entity 1300 (e.g., from the communication interface 1310 that receives the information via radio frequency signaling or some other type of signaling suitable for the applicable communication medium), process (e.g., decode) the information, and output the processed information. For example, the communication and processing circuitry 1342 may output the information to another component of the processor 1304, to the memory 1305, or to the bus interface 1308. In some examples, the communication and processing circuitry 1342 may receive one or more of signals, messages, other information, or any combination thereof. In some examples, the communication and processing circuitry 1342 may receive information via one or more channels. In some examples, the communication and processing circuitry 1342 may include functionality for a means for receiving. In some examples, the communication and processing circuitry 1342 may include functionality for a means for processing, including a means for modulating, a means for demodulating, a means for coding, a means for decoding, a means for generating, etc.

In some implementations where the communication involves sending (e.g., transmitting) information, the communication and processing circuitry 1342 may obtain information (e.g., from another component of the processor 1304, the memory 1305, or the bus interface 1308), process (e.g., modulate, encode, etc.) the information, and output the processed information. For example, the communication and processing circuitry 1342 may output the information to the communication interface 1310 (e.g., that transmits the information via radio frequency signaling or some other type of signaling suitable for the applicable communication medium). In some examples, the communication and processing circuitry 1342 may send one or more of signals, messages, other information, or any combination thereof. In some examples, the communication and processing circuitry 1342 may send information via one or more channels. In some examples, the communication and processing circuitry 1342 may include functionality for a means for sending (e.g., a means for transmitting). In some examples, the communication and processing circuitry 1342 may include functionality for a means for generating, including a means for modulating, a means for encoding, etc.

The communication and processing circuitry 1342 may be configured to provide a downlink transmission to an ambient Internet of Things (IoT) device. In addition, the communication and processing circuitry 1342 may be configured to: generate a CP-transparent on-off keying (OOK) orthogonal frequency-division multiplexing (OFDM) waveform that includes a CP that is transmitted to the ambient IoT device. Further, the communication and processing circuitry 1342 may be configured to: generate a pre-defined duration for each of the symbols of the transmitted CP-transparent OOK OFDM waveform, wherein, the pre-defined duration of each of the symbols of the transmitted CP-transparent OOK OFDM waveform is defined such that a last OOK OFDM symbol duration is set to be the same as a first OOK OFDM symbol duration, in which, the first OOK OFDM symbol includes the CP.

In some examples, the communication and processing circuitry 1342 may further be configured to execute communication and processing instructions (software) 1352 stored in the computer-readable medium 1306 to implement general communications functions of the network entity 1300, as well as one or more of the functions described herein.

The processor 1304 may further include CP-transparent OOK OFDM waveform generation circuitry 1344. The CP-transparent OOK OFDM waveform generation circuitry 1344 may further be configured to operate together with the communication and processing circuitry 1342 of the processor 1304 to: generate a CP-transparent on-off keying (OOK) orthogonal frequency-division multiplexing (OFDM) waveform and a pre-defined duration for each of the symbols of the transmitted CP-transparent OOK OFDM waveform, wherein, the pre-defined duration of each of the symbols of the transmitted CP-transparent OOK OFDM waveform is defined such that a last OOK OFDM symbol duration is set to be the same as a first OOK OFDM symbol duration, in which, the first OOK OFDM symbol includes the CP; and transmit the CP-transparent OOK OFDM waveform that includes the CP to the ambient IoT device. Therefore, the CP-transparent OOK OFDM waveform generation circuitry 1344 may be configured to execute CP-transparent OOK OFDM waveform generation instructions (software) 1354 stored in the computer-readable medium 1306 to implement one or more of the functions described herein.

In some examples, the pre-defined duration of each symbol of the transmitted OOK OFDM waveform to the ambient IoT device is equal to the duration of an OFDM symbol including a CP length divided by the number of OOK OFDM symbols, as previously described. In some examples, the pre-defined sampling rate is set to be equal to the pre-defined duration of each symbol of the transmitted OOK OFDM waveform, as previously described. In some examples, a Zadoff-Chu (ZC) sequence length is set for an ON duration for intermediate OOK symbols of the transmitted OOK OFDM waveform, as previously described. In some examples, a ZC sequence length is set for the first symbol of the OOK OFDM waveform to account for CP length, as previously described. In some examples, the first and last symbols of the transmitted OOK OFDM waveform include matching bits for a synchronization sequence signal, as previously described.

In some examples, the communication and processing circuitry 1342 of the network entity 1300 is further configured to: transmit a control bit to indicate availability of the CP-transparent OOK OFDM waveform, and the pre-defined equal-length duration of each symbol of the transmitted CP-transparent OOK OFDM waveform, such that the ambient IoT, based upon the selection of the control bit, can decode data from the received OOK OFDM waveform by sampling based upon a sampling rate equal to the pre-defined equal-length duration of each symbol of the CP-transparent OOK OFDM waveform. In some examples, the ambient IoT device, based upon the received control bit for the OOK OFDM waveform for data, can apply decoding for the data of the received OOK OFDM waveform at the pre-defined sampling rate, as previously described.

Figure 14:
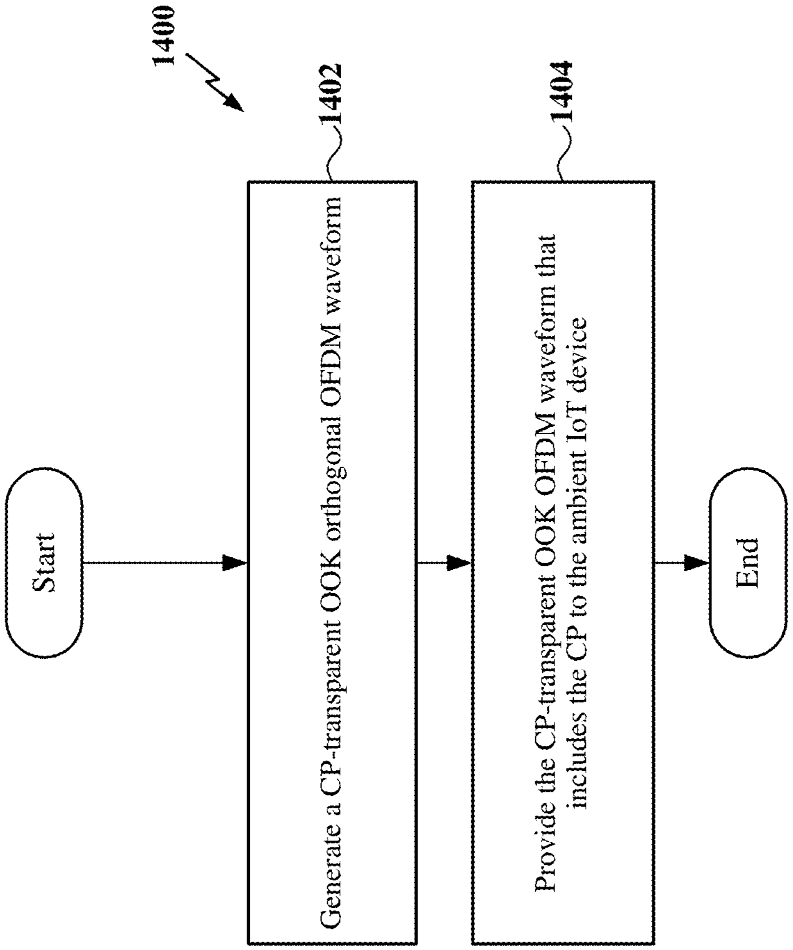
FIG. 14 is a flow chart of an exemplary process for generating and transmitting a CP-transparent OOK OFDM waveform from a network entity to an ambient IoT, according to some aspects.

FIG. 14 is a flow chart of an exemplary process 1400 for generating and transmitting a CP-transparent OOK OFDM waveform from a network entity to an ambient IoT, according to some aspects. As described below, some or all illustrated features may be omitted in a particular implementation within the scope of the present disclosure, and some illustrated features may not be required for implementation of all examples. In some examples, the method may be performed by the network entity 1300, as described above and illustrated in FIG. 13, by a processor or processing system, or by any suitable means for carrying out the described functions.

At block 1402, the network entity may generate a CP-transparent OOK OFDM waveform and a pre-defined duration for each of the symbols of the CP-transparent OOK OFDM waveform, wherein, the pre-defined duration of each of the symbols of the transmitted CP-transparent OOK OFDM waveform is defined such that a last OOK OFDM symbol duration is set to be the same as a first OOK OFDM symbol duration, in which, the first OOK OFDM symbol includes the CP. For example, the CP-transparent OOK OFDM waveform generator circuitry 1344, shown and described above in connection with FIG. 13, may provide a means to generate the CP-transparent OOK OFDM waveform.

At block 1404, the network entity may provide the CP-transparent OOK OFDM waveform that includes the CP to the ambient IoT device. For example, the communication and processing circuitry 1342 together with the communication interface 1310, shown and described above in connection with FIG. 13, may provide a means to provide the CP-transparent OOK OFDM waveform that includes the CP to the ambient IoT device.

In some examples, the pre-defined duration of each symbol of the transmitted OOK OFDM waveform to the ambient IoT device is equal to the duration of an OFDM symbol including a CP length divided by the number of OOK OFDM symbols, as previously described. In some examples, the pre-defined sampling rate is set to be equal to the pre-defined duration of each symbol of the transmitted OOK OFDM waveform, as previously described. In some examples, a Zadoff-Chu (ZC) sequence length is set for an ON duration for intermediate OOK symbols of the transmitted OOK OFDM waveform, as previously described. In some examples, a ZC sequence length is set for the first symbol of the OOK OFDM waveform to account for CP length, as previously described. In some examples, the first and last symbols of the transmitted OOK OFDM waveform include matching bits for a synchronization sequence signal, as previously described.

In some examples, the network entity is further configured to: transmit a control bit to indicate availability of the CP-transparent OOK OFDM waveform, and the pre-defined equal-length duration of each symbol of the transmitted CP-transparent OOK OFDM waveform, such that the ambient IoT, based upon the selection of the control bit, can decode data from the received CP-transparent OOK OFDM waveform by sampling based upon a sampling rate equal to the pre-defined equal-length duration of each symbol of the CP-transparent OOK OFDM waveform. In some examples, the ambient IoT device, based upon the received control bit for the OOK OFDM waveform for data, can apply decoding for the data of the received CP-transparent OOK OFDM waveform at the pre-defined sampling rate, as previously described.

In one configuration, the network entity 1300 includes means for generating a CP-transparent OOK orthogonal OFDM waveform and a pre-defined duration for each of the symbols of the CP-transparent OOK OFDM waveform, wherein, the pre-defined duration of each of the symbols of the transmitted CP-transparent OOK OFDM waveform is defined such that a last OOK OFDM symbol duration is set to be the same as a first OOK OFDM symbol duration, in which, the first OOK OFDM symbol includes the CP, and means for providing the CP-transparent OOK OFDM waveform to an ambient IoT device, as described in the present disclosure. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 3, 4-10, and/or 13 utilizing, for example, the processes and/or algorithms described herein in relation to FIG. 14.

The processes shown in FIGS. 12 and 14 may include additional aspects, such as any single aspect or any combination of aspects described below and/or in connection with one or more other processes described elsewhere herein.

Aspect 1: An ambient Internet of Things (IoT) device, comprising: one or more memories; and one or more processors coupled to the one or more memories, wherein the one or more processors are configured to: receive an on-off keying (OOK) orthogonal frequency-division multiplexing (OFDM) waveform including a cyclic prefix (CP); and sample symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP.

Aspect 2: The ambient IoT device of aspect 1, wherein, the pre-defined duration of each symbol of the received OOK OFDM waveform is equal to a duration of an OFDM symbol including a CP length divided by a number of OOK OFDM symbols.

Aspect 3: The ambient IoT device of aspect 2, wherein, the pre-defined sampling rate is set to be equal to the pre-defined duration of each symbol of the received OOK OFDM waveform.

Aspect 4: The ambient IoT device of any aspects 1 through 3, wherein, a Zadoff-Chu (ZC) sequence length is set for an ON duration for intermediate OOK symbols of the OOK OFDM waveform.

Aspect 5: The ambient IoT device of aspect 4, wherein, a ZC sequence length is set for a first symbol of the OOK OFDM waveform to account for CP length.

Aspect 6: The ambient IoT device of any aspects 1 through 5, wherein, first and last symbols of the received OOK OFDM waveform include matching bits for a synchronization sequence signal.

Aspect 7: The ambient IoT device of any aspects 1 through 6, wherein the one or more processors are further configured to: receive a control bit to indicate decoding of the received OOK OFDM waveform for data.

Aspect 8: The ambient IoT device of aspect 7, wherein the one or more processors are further configured to: based upon the received control bit to indicate decoding of the received OOK OFDM waveform for data, applying decoding of the received OOK OFDM waveform at the pre-defined sampling rate.

Aspect 9: A method operable at an ambient Internet of Things (IoT) device, the method comprising: receiving an on-off keying (OOK) orthogonal frequency-division multiplexing (OFDM) waveform including a cyclic prefix (CP); and sampling symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP.

Aspect 10: The method of aspect 9, wherein, the pre-defined duration of each symbol of the received OOK OFDM waveform is equal to a duration of an OFDM symbol including a CP length divided by a number of OOK OFDM symbols.

Aspect 11: The method of aspect 10, wherein, the pre-defined sampling rate is set to be equal to the pre-defined duration of each symbol of the received OOK OFDM waveform.

Aspect 12: The method of any aspects 9 through 11, wherein, a Zadoff-Chu (ZC) sequence length is set for an ON duration for intermediate OOK symbols of the OOK OFDM waveform.

Aspect 13: The method of aspect 12, wherein, a ZC sequence length is set for a first symbol of the OOK OFDM waveform to account for CP length.

Aspect 14: The method of any aspects 9 through 13, wherein, first and last symbols of the received OOK OFDM waveform include matching bits for a synchronization sequence signal.

Aspect 15: The method of any aspects 9 through 14, further comprising: receiving a control bit to indicate decoding of the received OOK OFDM waveform for data.

Aspect 16: The method of aspect 15, further comprising: based upon the received control bit to indicate decoding of the received OOK OFDM waveform for data, applying decoding of the received OOK OFDM waveform at the pre-defined sampling rate.

Aspect 17: An ambient Internet of Things (IoT) device, comprising: means for receiving an on-off keying (OOK) orthogonal frequency-division multiplexing (OFDM) waveform including a cyclic prefix (CP); and means for sampling symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP.

Aspect 18: The ambient IoT device of aspect 17, wherein, the pre-defined duration of each symbol of the received OOK OFDM waveform is equal to a duration of an OFDM symbol including a CP length divided by a number of OOK OFDM symbols.

Aspect 19: The ambient IoT device of aspect 18, wherein, the pre-defined sampling rate is set to be equal to the pre-defined duration of each symbol of the received OOK OFDM waveform.

Aspect 20: The ambient IoT device of any aspects 17 through 19, wherein, a Zadoff-Chu (ZC) sequence length is set for an ON duration for intermediate OOK symbols of the OOK OFDM waveform.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word “exemplary” is used to mean “serving as an example, instance, or illustration.” Any implementation or aspect described herein as “exemplary” is not necessarily to be construed as preferred or advantageous over other aspects of the disclosure. Likewise, the term “aspects” does not require that all aspects of the disclosure include the discussed feature, advantage or mode of operation. The term “coupled” is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms “circuit” and “circuitry” are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 4-6, 8, 10, 11 and/or 13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean “one and only one” unless specifically so stated, but rather “one or more.” Unless specifically stated otherwise, the term “some” refers to one or more. A phrase referring to “at least one of” a list of items refers to any combination of those items, including single members. As an example, “at least one of: a, b, or c” is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An ambient Internet of Things (IoT) device, comprising:

one or more memories; and one or more processors coupled to the one or more memories, wherein the one or more processors are configured to:

receive an on-off keying (OOK) orthogonal frequency-division multiplexing (OFDM) waveform including a cyclic prefix (CP) and a control bit to indicate decoding of the received OOK OFDM waveform for data;

sample symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP; and based upon the received control bit to indicate decoding of the received OOK OFDM waveform for data, apply decoding of the received OOK OFDM waveform at the pre-defined sampling rate.

2. The ambient IoT device of claim 1, wherein, the pre-defined duration of each symbol of the received OOK OFDM waveform is equal to a duration of an OFDM symbol including a CP length divided by a number of OOK OFDM symbols.

3. The ambient IoT device of claim 2, wherein, the pre-defined sampling rate is set to be equal to the pre-defined duration of each symbol of the received OOK OFDM waveform.

4. The ambient IoT device of claim 1, wherein, a Zadoff-Chu (ZC) sequence length is set for an ON duration for intermediate OOK symbols of the OOK OFDM waveform.

5. The ambient IoT device of claim 4, wherein, a ZC sequence length is set for a first symbol of the OOK OFDM waveform to account for CP length.

6. The ambient IoT device of claim 1, wherein, first and last symbols of the received OOK OFDM waveform include matching bits for a synchronization sequence signal.

7. A method operable at an ambient Internet of Things (IoT) device, the method comprising:

receiving an on-off keying (OOK) orthogonal frequency-division multiplexing (OFDM) waveform including a cyclic prefix (CP) and a control bit to indicate decoding of the received OOK OFDM waveform for data;

sampling symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP; and based upon the received control bit to indicate decoding of the received OOK OFDM waveform for data, applying decoding of the received OOK OFDM waveform at the pre-defined sampling rate.

8. The method of claim 7, wherein, the pre-defined duration of each symbol of the received OOK OFDM waveform is equal to a duration of an OFDM symbol including a CP length divided by a number of OOK OFDM symbols.

9. The method of claim 8, wherein, the pre-defined sampling rate is set to be equal to the pre-defined duration of each symbol of the received OOK OFDM waveform.

10. The method of claim 7, wherein, a Zadoff-Chu (ZC) sequence length is set for an ON duration for intermediate OOK symbols of the OOK OFDM waveform.

11. The method of claim 10, wherein, a ZC sequence length is set for a first symbol of the OOK OFDM waveform to account for CP length.

12. The method of claim 7, wherein, first and last symbols of the received OOK OFDM waveform include matching bits for a synchronization sequence signal.

13. An ambient Internet of Things (IoT) device, comprising:

means for receiving an on-off keying (OOK) orthogonal frequency-division multiplexing (OFDM) waveform including a cyclic prefix (CP) and a control bit to indicate decoding of the received OOK OFDM waveform for data;

means for sampling symbols of the received OOK OFDM waveform at a pre-defined sampling rate, wherein, the pre-defined sampling rate is based upon a pre-defined duration of the symbols of the received OOK OFDM waveform, the pre-defined duration of each of the symbols of the received OOK OFDM waveform defined such that a last OOK OFDM symbol duration is set to be the same as a first OOK OFDM symbol duration, wherein the first OOK OFDM symbol includes the CP; and means for applying decoding of the received OOK OFDM waveform at the pre-defined sampling rate based upon the received control bit to indicate decoding of the received OOK OFDM waveform for data.

14. The ambient IoT device of claim 13, wherein, the pre-defined duration of each symbol of the received OOK OFDM waveform is equal to a duration of an OFDM symbol including a CP length divided by a number of OOK OFDM symbols.

15. The ambient IoT device of claim 14, wherein, the pre-defined sampling rate is set to be equal to the pre-defined duration of each symbol of the received OOK OFDM waveform.

16. The ambient IoT device of claim 13, wherein, a Zadoff-Chu (ZC) sequence length is set for an ON duration for intermediate OOK symbols of the OOK OFDM waveform.

17. The ambient IoT device of claim 16, wherein, a ZC sequence length is set for a first symbol of the OOK OFDM waveform to account for CP length.

18. The ambient IoT device of claim 13, wherein, first and last symbols of the received OOK OFDM waveform include matching bits for a synchronization sequence signal.

* * * * *